United States Patent
Hagano

(10) Patent No.: US 7,290,673 B2
(45) Date of Patent: Nov. 6, 2007

(54) CAP DEVICE

(75) Inventor: Hiroyuki Hagano, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 322 days.

(21) Appl. No.: 10/932,317

(22) Filed: Sep. 2, 2004

(65) Prior Publication Data

US 2005/0051557 A1 Mar. 10, 2005

(30) Foreign Application Priority Data

Sep. 5, 2003 (JP) ............................ 2003-314149
Sep. 19, 2003 (JP) ............................ 2003-327417

(51) Int. Cl.
*B65D 41/04* (2006.01)
(52) U.S. Cl. .............................. 220/288; 220/DIG. 33; 220/86.2; 220/304
(58) Field of Classification Search ............... 220/DIG. 32–DIG. 33, 303, 203.28, 203.26, 203.24, 220/86.2, 304
See application file for complete search history.

(56) References Cited

U.S. PATENT DOCUMENTS

| 4,579,247 | A | | 4/1986 | Hasui et al. | |
|---|---|---|---|---|---|
| 4,779,755 | A | * | 10/1988 | Harris | 220/203.21 |
| 5,449,086 | A | * | 9/1995 | Harris | 220/288 |
| 5,975,328 | A | | 11/1999 | Hagano et al. | |
| 6,763,966 | B2 | * | 7/2004 | Harris | 220/293 |
| 2002/0066734 | A1 | * | 6/2002 | Harris | 220/304 |
| 2003/0102314 | A1 | * | 6/2003 | Hagano et al. | 220/304 |
| 2004/0000553 | A1 | * | 1/2004 | Ueki | 220/293 |

FOREIGN PATENT DOCUMENTS

| EP | 0 869 028 A2 | 7/1998 |
|---|---|---|
| EP | 1 040 952 A2 | 3/2000 |
| JP | A-10-329861 | 12/1998 |

OTHER PUBLICATIONS

U.S. Appl. No. 10/852,694, filed May 25, 2004, Hagano et al.

* cited by examiner

*Primary Examiner*—Anthony Stashick
*Assistant Examiner*—Christopher McKniley
(74) *Attorney, Agent, or Firm*—Posz Law Group, PLC

(57) ABSTRACT

A cap device or fuel cap has a cap main body, a cover, and a torque plate that transmits a rotational torque. The torque plate is attached to the cap main body in a rotatable manner through engagement of catching claws formed on the outer circumference of the torque plate with catching projections formed on the cap main body. The cover is held on the torque plate in a rotatable manner through engagement of engagement projections formed on the inner wall of the cover with catching claws formed on respective fixation elements. The engagement projections are arranged about an axis of the cap main body and outside the catching claws. The engagement projections are thus readily released from engagement with the catching claws under application of an external force in any of diverse directions, for example, due to a collision of a vehicle, so as to maintain the sufficient sealing properties of the cap main body.

3 Claims, 18 Drawing Sheets

CAP DEVICE

This application claims the benefit of and priority from Japanese Application No. 2003-314149 filed Sep. 5, 2003, and Japanese Application No. 2003-327417 filed Sep. 19, 2003, the contents of which are incorporated herein by reference.

BACKGROUND OF THE INVENTION

1. Field of the Invention

The present invention relates to a cap device that is detachably attached to a tank opening.

2. Description of the Related Art

A cap device has, for example, a known structure shown in FIG. 28 (see No. JP 10-329861A). FIG. 28 is a partly sectional, side view showing a prior art fuel cap 200 for a fuel tank of an automobile. The fuel cap 200 has a cap main body 202 and a cover 210 attached to an upper flange 204 of the cap main body 202. The flange 204 has an outer ring element 206 to hold the cover 210, and a joint element 208 that connects the outer ring element 206 with a lower portion of the cap main body 202. The joint element 208 has a fragile part with notches 209. The fragile part is a starting point of breakage of the joint element 208 under application of an external force in any of diverse directions to the flange 204 via the cover 210. In the case of application of an extremely large external force to the periphery of the fuel cap 200, for example, in the event of a collision of the automobile, the fragile part of the joint element 208 is broken to maintain the sufficient sealing properties of the cap device and effectively seal the fuel tank from the atmosphere.

Such breakage is, however, not restricted in the event of the collision of the automobile. Some inadvertent use of the fuel cap 200, for example, an accidental drop of the fuel cap 200 during fuel supply or localized application of a large static load to the lower end of the cover 210, also causes breakage of the fragile part to significantly damage the cap device 200. The breaking load at the fragile part depends upon the direction and the depth of the notches formed in the flange 204. Accurate design of the fragile part to attain breakage under application of loading in a predetermined range is rather difficult, since the flange 204 has a narrow width and only limited design freedom.

SUMMARY OF THE INVENTION

The object of the invention is to eliminate the drawbacks of the prior art and to provide a cap device of simple structure that does not damage its functions even in the event of an accidental drop of the cap device and maintains the sufficient sealing properties even under loading of an external force.

In order to attain at least part of the above and the other related objects, the present invention is directed to a cap device that opens and closes a tank opening. The cap device includes: a closer that closes the tank opening; a handle mechanism that rotates the closer about a rotation axis of the closer; a circular plate member that is interposed between the closer and the handle mechanism; a plate attachment mechanism that attaches the circular plate member to the closer in a rotatable manner, while causing part of the circular plate member to be elastically deformed by an external force applied to the handle mechanism and thereby detaching the circular plate member from the closer; and a handle mechanism attachment mechanism that holds the handle mechanism on an outer circumference of the circular plate member in a freely rotatable manner. The handle mechanism attachment mechanism is arranged about the rotation axis of the closer and outside the plate attachment mechanism.

In the cap device of the invention, the closer is inserted into the tank opening, and the handle mechanism then rotates to make the closer open and close the tank opening. The circular plate member is located between the closer and the handle mechanism and is attached to the closer by means of the plate attachment mechanism. The plate attachment mechanism elastically deforms part of the circular plate member or the closer to detach the circular plate member from the closer.

The plate attachment mechanism readily sets the loading required for detachment of the circular plate member from the closer by simply changing the shape, the number, and the mechanical strength of the elastically deformable part of the circular plate member or the closer. The plate attachment mechanism thus readily sets the breaking load in any of diverse directions of an external force without restriction of the sealing structure of the closer.

The cap device of the invention has the handle mechanism attachment mechanism that holds the handle mechanism on the outer circumference of the circular plate member in a freely rotatable manner. The handle mechanism attachment mechanism causes part of the handle mechanism or the circular plate member to be elastically deformed and thereby easily detaches the handle mechanism from the circular plate member. The handle mechanism attachment mechanism is arranged about the rotation axis of the closer and outside the plate attachment mechanism. The handle mechanism attachment mechanism produces a moment as a force of detaching the circular plate member from the closer under application of a lateral external force to the handle mechanism, thus enabling the circular plate member to be readily detached from the closer.

When a large external force is applied to the cap device to detach the handle mechanism from the circular plate member, for example, due to an accidental drop of the cap device during fuel supply, elastic deformation of the handle mechanism attachment mechanism enables the separate handle mechanism to be attached again to the circular plate member. The cap device of this structure is not significantly damaged in the event of an accidental drop, unlike the prior art cap that is broken at the fragile part.

In one preferable embodiment of the cap device of the invention, the circular plate member is a torque plate that transmits a rotational torque, which is applied to the handle mechanism in either of a closing direction and an opening direction, to the closer to an extent of not exceeding a preset level.

In this preferable embodiment, the plate attachment mechanism may have an elastically deformable catching claw that is formed on an outer circumference of the torque plate, and a catching projection that is formed on an outer circumference of the closer to engage with the catching claw. The handle mechanism may include a handle, and a cover that holds the handle and surrounds an upper portion and the outer circumference of the torque plate. The handle mechanism attachment mechanism may have an engagement projection that is formed on an inner wall of the cover, and a catching recess that is formed on the outer circumference of the torque plate to receive the engagement projection fit therein.

These and other objects, features, aspects, and advantages of the present invention will become more apparent from the following detailed description of the preferred embodiments with the accompanied drawings.

DESCRIPTION OF THE PREFERRED EMBODIMENTS

Some modes of carrying out the invention are discussed below as preferred embodiments.

(1) General Structure of Fuel Cap 10

Figure 1:
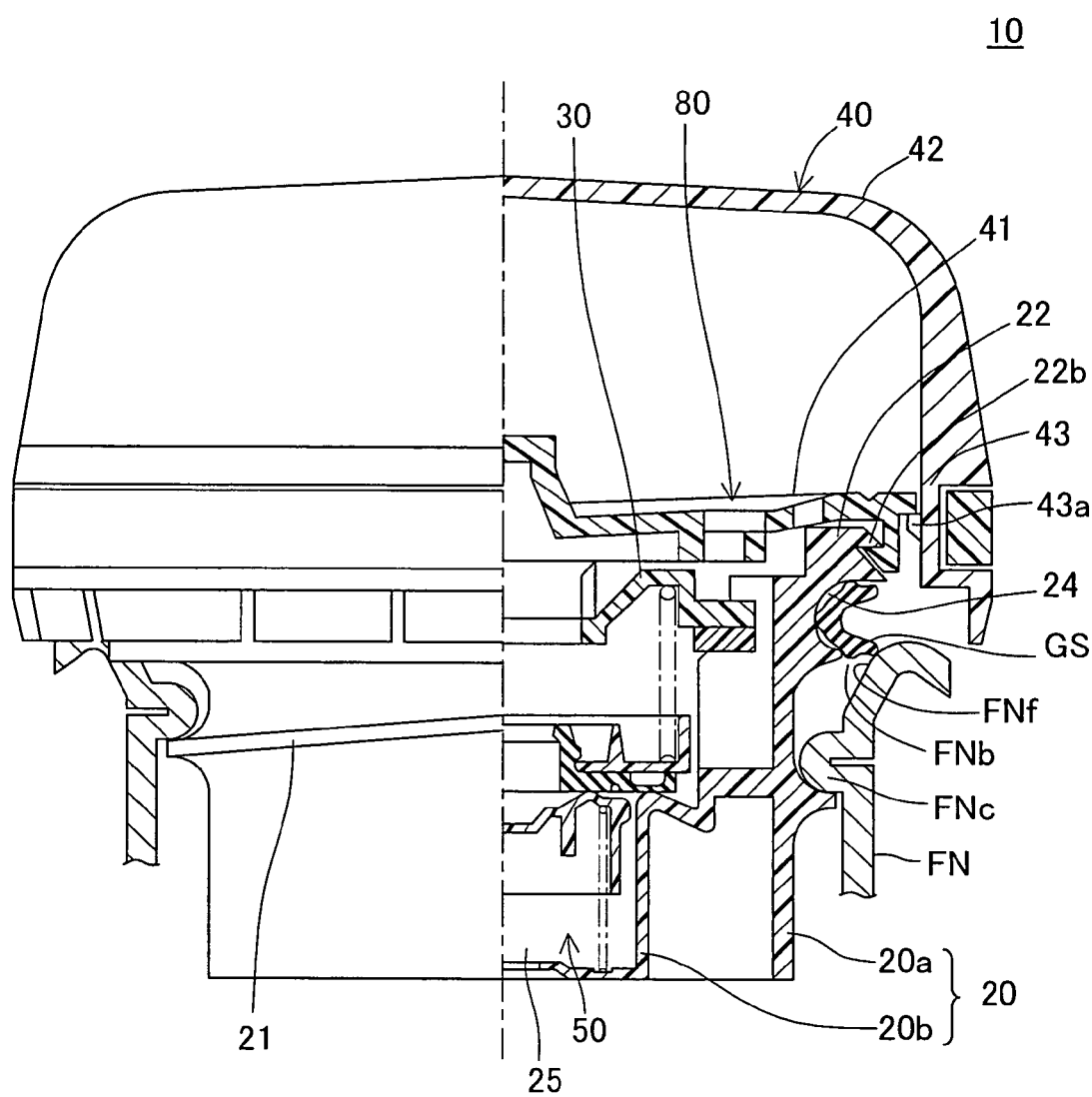
FIG. 1 is a half sectional view showing a fuel cap in one embodiment of the invention.

FIG. 1 is a half sectional view showing a fuel cap 10 (cap device) in one embodiment of the invention. The fuel cap 10 is attached to a filler neck FN having an inlet opening FNb (tank opening) to feed a supply of fuel to a fuel tank (not shown). The fuel cap 10 has a cap main body 20 (closer) that is made of a synthetic resin material like polyacetal, a cover 40 that is mounted on the cap main body 20 and has a handle the cover 40 made of a synthetic resin material like nylon, an inner cover 30 that closes an upper opening of the cap main body 20 and defines a valve chest 25, a pressure regulating valve 50 that is received in the valve chest 25, a torque mechanism 80, and a ring-shaped gasket GS that is attached to the upper outer circumference of the cap main body 20 to seal the cap main body 20 from the filler neck FN.

(2) Construction of Constituents of Fuel Cap 10

The construction of the respective constituents of the fuel cap 10 in the embodiment is discussed below in detail.

(2)-1 Cap Main Body 20

The cap main body 20 has a substantially cylindrical outer tubular body 20a with a male threading element 21 (second threading element), which engages with a female threading element FNc (first threading element) formed on the inner wall of the pipe-shaped filler neck FN (opening-formation member), and a valve chest-formation body 20b that is located in the lower portion of the inside of the outer tubular body 20a. The valve chest-formation body 20b receives a positive pressure valve and a negative pressure valve functioning as the pressure regulating valve 50 therein. The inner cover 30 is pressed into the upper portion of the valve chest-formation body 20b to cover over the valve chest 25.

The gasket GS is set on a lower face of an upper flange 22 of the cap main body 20. The gasket GS is located between a seal support element 24 of the flange 22 and the inlet opening FNb of the filler neck FN. When the fuel cap 10 is inserted into the inlet opening FNb, the gasket GS is pressed against the seal support element 24 to exert the sealing effects. The seal support element 24 has a curved face to hold the gasket GS.

Figure 2:
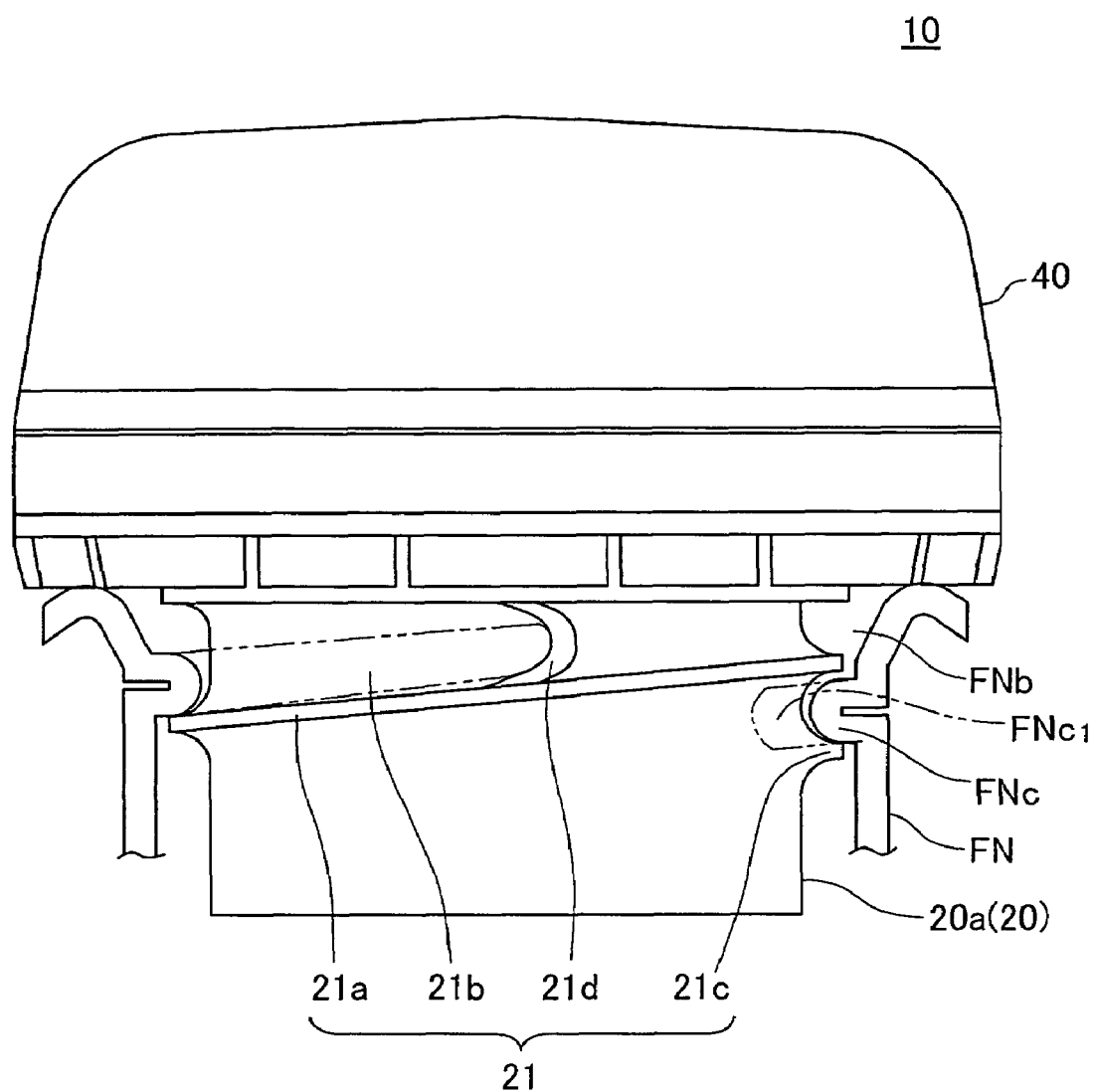
FIG. 2 shows the fuel cap that is screwed to a filler neck to close a inlet opening.
Figure 3:
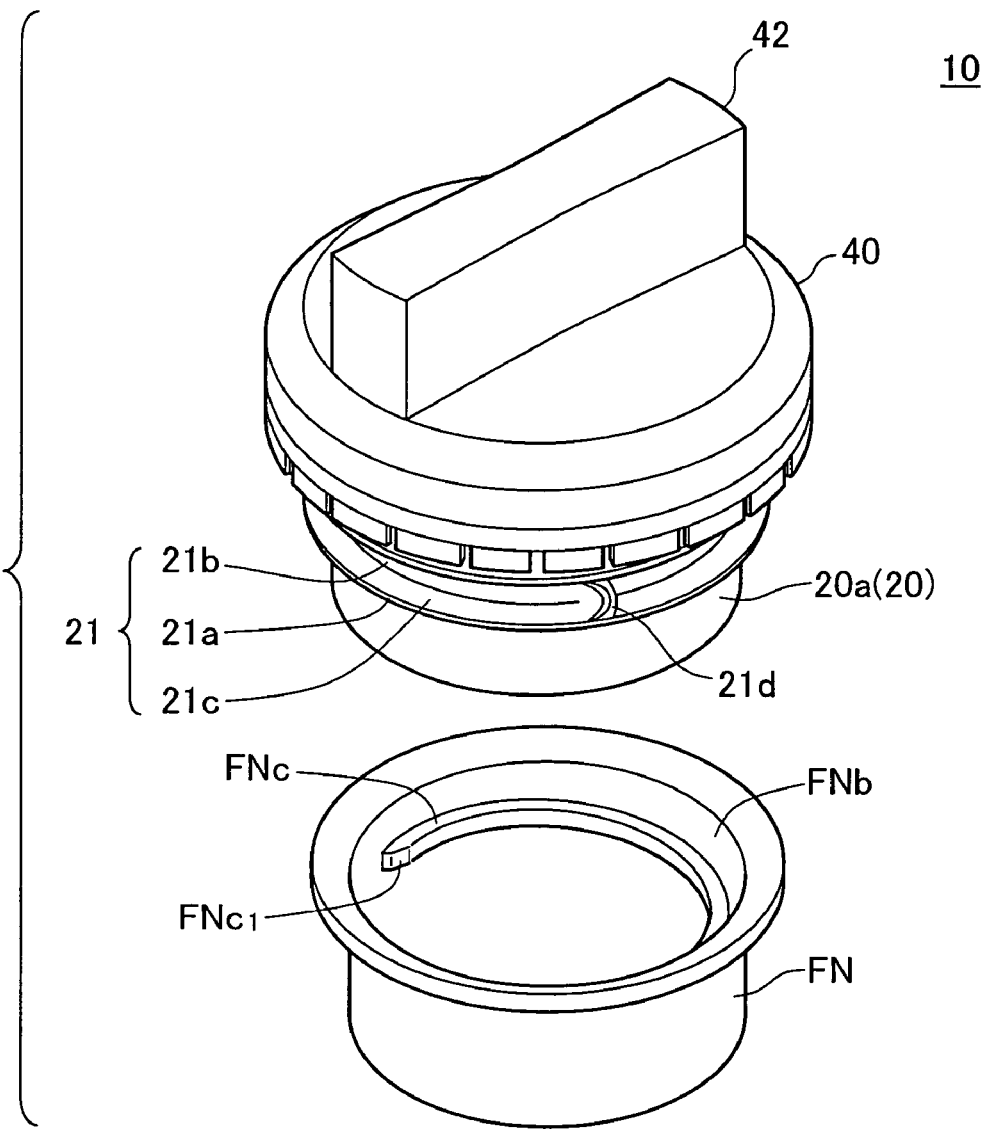
FIG. 3 is a perspective view showing the fuel cap detached from the filler neck.

FIG. 2 shows the fuel cap 10 that is screwed to the filler neck FN to close the inlet opening FNb. FIG. 3 is a perspective view showing the fuel cap 10 detached from the filler neck FN. With referring to FIGS. 2 and 3, a screw mechanism is formed on the inner circumferential wall of the filler neck FN and the outer circumference of the outer tubular body 20a of the cap main body 20. The screw mechanism functions to screw the fuel cap 10 to the filler neck FN, and includes the female threading element FNc (first threading element) formed on the inner wall of the filler neck FN and the male threading element 21 (second threading element) formed on the lower portion of the outer circumference of the outer tubular body 20a. The female threading element FNc is threading projections from a leader FNc1 close to the inlet opening FNb toward the depth of the fuel tank. The male threading element 21 has a thread ridge 21a and a thread groove 21b. The lower end of the thread ridge 21a is a leader 21c that engages with the leader FNc1 of the female threading element FNc (see FIG. 2). A stopper 21d is formed upright to cross the thread groove 21b. The stopper 21d is located at a position of about 200 degrees from the leader 21c of the male threading element 21. When the fuel cap 10 is inserted into the inlet opening FNb, the stopper 21d comes into contact with the leader FNc1 of the female threading element FNc to restrict further rotation of the fuel cap 10 in its closing direction. The female threading element FNc has a screw thread pitch of 6.35 mm per rotation.

When the fuel cap 10 fit in the inlet opening FNb is rotated in its closing direction, the male threading element 21 is screwed in the female threading element FNc. When the gasket GS is compressed in the axial direction to or over a preset displacement, the stopper 21d comes into contact with the leader FNc1 of the female threading element FNc to restrict further rotation. The fuel cap 10 is fastened to the filler neck FN in this state.

(2)-2 Gasket (2)-2-1 Structure of Gasket GS

Figure 4:
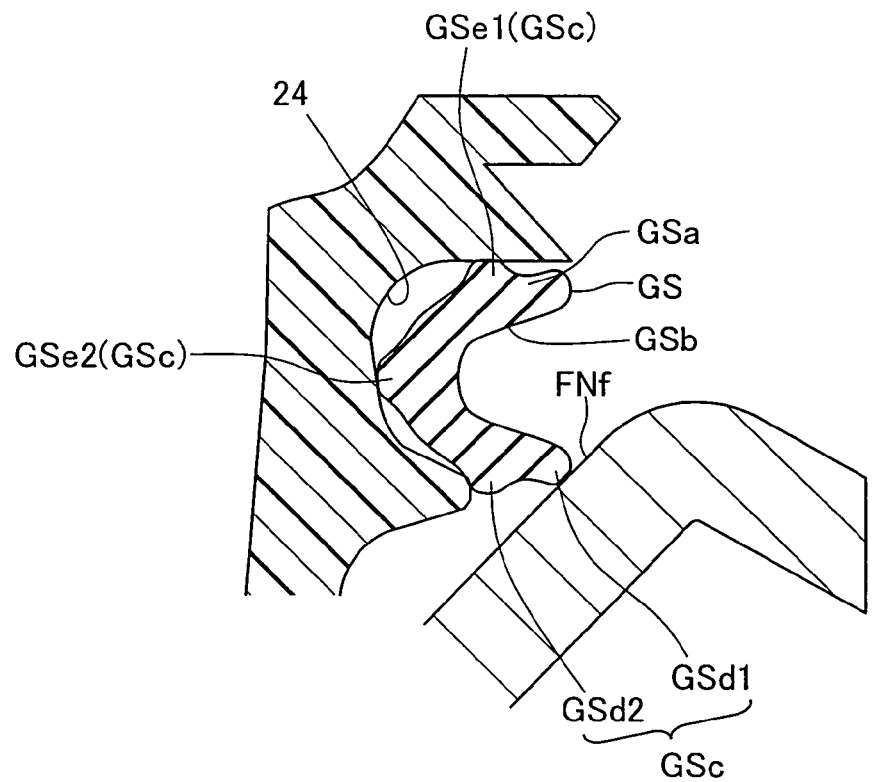
FIG. 4 is an enlarged sectional view showing a gasket attached to a seal support element of the fuel cap.

FIG. 4 is an enlarged sectional view showing the gasket GS attached to the seal support element 24 of the fuel cap 10. The gasket GS has a gasket main body GSa that is formed in a substantially V shape and is compressed to shorten the length in its bending direction. The gasket main body GSa has a substantially U-shaped slit GSb open to the outer circumference.

Multiple sealing projections GSc are protruded from the outer circumference of the gasket main body GSa. The multiple sealing projections GSc include a first pipe sealing projection GSd1 and a second pipe sealing projection GSd2, which come into contact with a pipe sealing face FNf, and a first body sealing projection GSe1 and a second body sealing projection GSe2, which come into contact with the seal support element 24.

The first pipe sealing projection GSd1 is formed on an opening end of the slit GSb and is protruded to be pressed against the pipe sealing face FNf in an initial stage of a closing operation. The second pipe sealing projection GSd2 is protruded to have a greater sealing face pressure than the first pipe sealing projection GSd1 and to be pressed against the pipe sealing face FNf after the initial stage of the closing operation.

Figure 5:
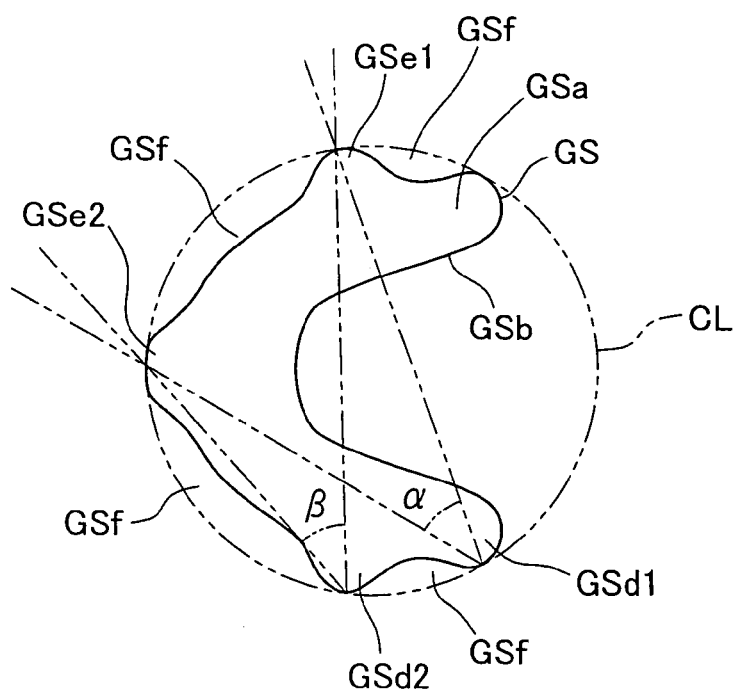
FIG. 5 illustrates the shape of the gasket.
Figure 6A:
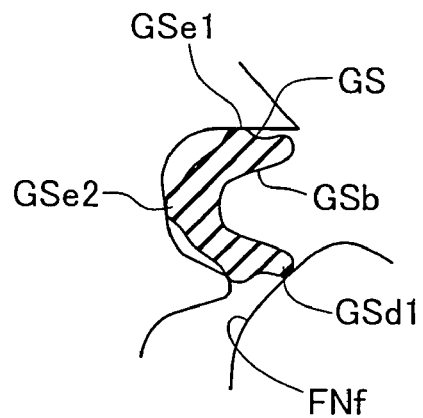
FIG. 6(A) shows a series of compression of the gasket as the fuel cap is closed.
Figure 6B:
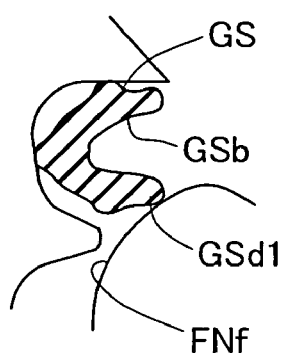
FIG. 6(B) shows the series of the compression of the gasket after the state of FIG. 6(A)
Figure 6C:
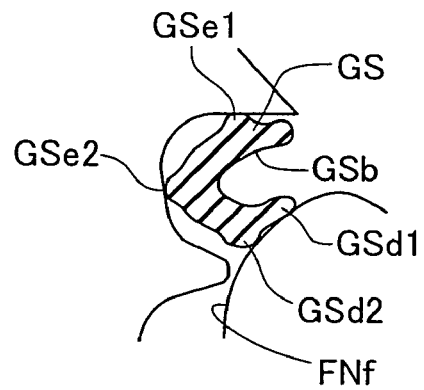
FIG. 6(C) shows the series of the compression of the gasket after the state of FIG. 6(B)
Figure 6D:
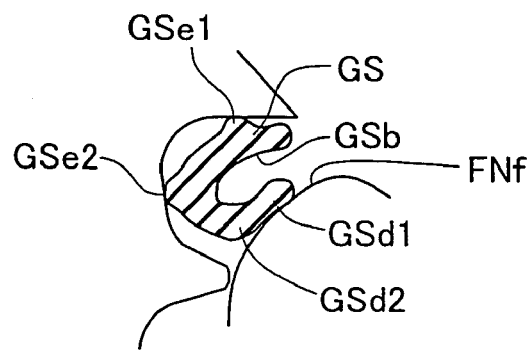
FIG. 6(D) shows the series of the compression of the gasket after the state of FIG. 6(C)

FIG. 5 illustrates the shape of the gasket GS. As illustrated in FIG. 5, the first body sealing projection GSe1 and the second body sealing projection GSe2 are positioned to have practically equal angles α and β in a range of 30 to 45 degrees to the first pipe sealing projection GSd1 and to the second pipe sealing projection GSd2 in a non-compressed state of the gasket GS. The first body sealing projection GSe1 and the second body sealing projection GSe2 are positioned to produce a maximum stress to a reactive force produced when the first pipe sealing projection GSd1 and the second pipe sealing projection GSd2 are pressed against the pipe sealing face FNf.

The gasket main body GSa has thin wall sections GSf between the adjoining sealing projections GSc to define hollow elements from the seal support element 24. The hollow elements defined by the thin wall sections GSf reduce the total cross section of the gasket GS to 30 to 50% or preferably 35 to 45% of the area of an imaginary circle CL going through the apexes of the sealing projections GSc.

The sealing projections GSc preferably have a curvature R of not less than 0.5 mm. This curvature facilitates cleaning of recesses in an injection mold for the gasket GS with the sealing projections GSc and enhances the productivity.

(2)-2-2 Functions of Gasket GS

FIG. 6 shows compression of the gasket GS as the fuel cap 10 is closed. In the initial stage of the closing operation of the fuel cap 10, the first pipe sealing projection GSd1 of the gasket GS comes into contact with the pipe sealing face FNf (FIG. 6(A)). The further closing operation causes the gasket GS to be compressed in the bending direction and narrow the opening of the slit GSb (FIG. 6(B)). In the next stage, the second pipe sealing projection GSd2 comes into contact with the pipe sealing face FNf (FIG. 6(C)). In the last stage, the second pipe sealing projection GSd2 is pressed against the pipe sealing face FNf, so that the fuel cap 10 closes the inlet opening FNb (FIG. 6(D)). Namely the first pipe sealing projection GSd1 mainly exerts the sealing effects in the initial stage of the closing operation. The second pipe sealing projection GSd2 exerts the sealing effects in the closed state of the fuel cap 10.

Figure 7:
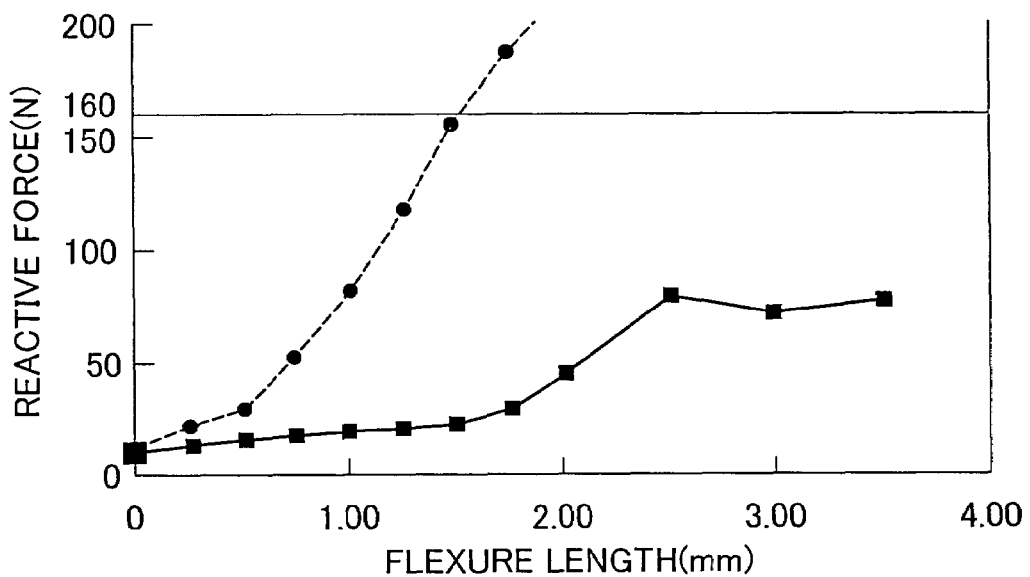
FIG. 7 is a graph showing variations in reactive force against the flexure length of the gasket.

FIG. 7 is a graph showing variations in reactive force against the flexure length of the gasket. The solid-line curve regards the gasket GS of the embodiment and the dotted-line curve regards a prior art C-shaped gasket. Here the flexure length represents a compressed length (compression degree) of the gasket in its bending direction. The relation between the flexure length and the rotational angle of the fuel cap depends upon various parameters like the hardness and the shape of the gasket. In an example where a 360-degree rotation of a fuel cap gives a flexure length of 6.3 mm, the fuel cap closed at an angle of 198 degrees gives a flexure length of 3.6 mm. The fuel cap rotated from its full close position in its opening direction by 90 degrees gives a flexure length of 1.6 mm.

The closing operation of the fuel cap bends the gasket and increases the reactive force of the gasket. The reactive force of greater than 160 N produced in the closing operation of the fuel cap deteriorates the operating characteristics of the fuel cap. The reactive force is thus preferably not greater than 160 N or more preferably not greater than 130 N. The prior art gasket gives only a flexure length of about 1.5 mm at the reactive force of 160 N and has an abrupt increase in reactive force to deteriorate the operating characteristics. The gasket GS of the embodiment, on the other hand, gives a flexure length of at least 3.6 mm in the full close position and does not have any abrupt increase in reactive force to ensure the good operating characteristics.

Figure 8:
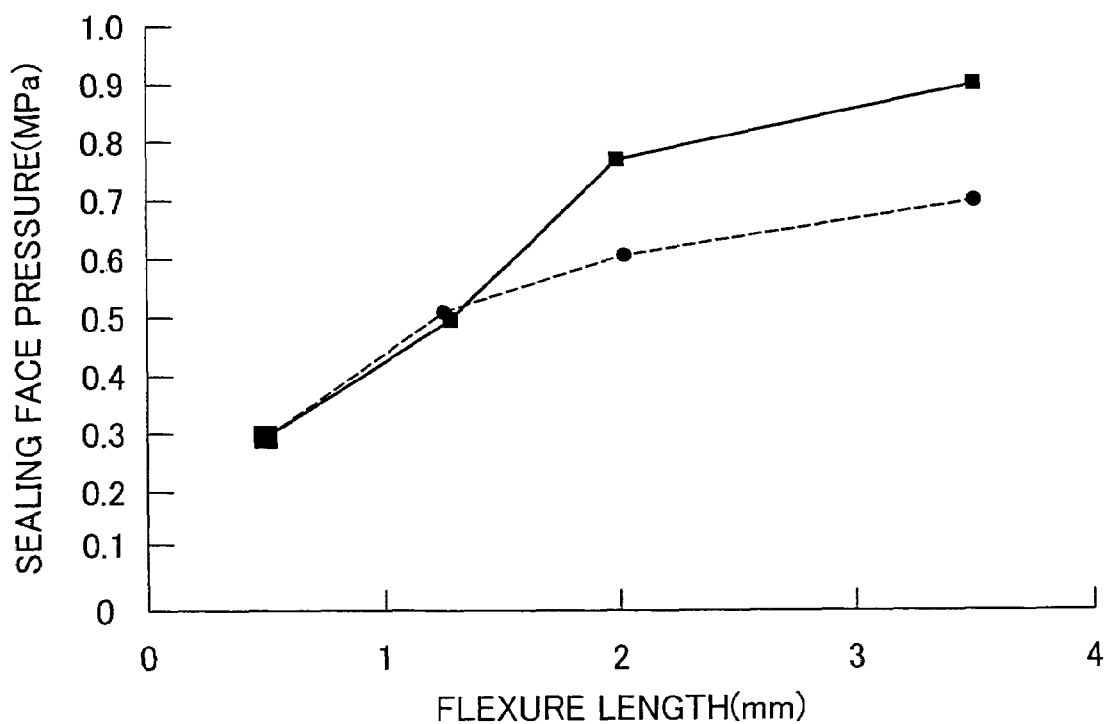
FIG. 8 is a graph showing variations in sealing face pressure against the flexure length of the gasket.

FIG. 8 is a graph showing variations in sealing face pressure against the flexure length of the gasket. The solid-line curve regards the gasket GS of the embodiment and the dotted-line curve regards the prior art C-shaped gasket. Here the sealing face pressure represents a pressure of the gasket against the pipe sealing face FNf. As the fuel cap 10 is closed, the sealing face pressure increases with an increase in flexure length of the gasket GS. In the initial stage of the closing operation having the flexure length of 0.5 to 1.3 mm, the first pipe sealing projection GSd1 mainly contributes to the increase in sealing face pressure. With an increase in closing angle of the fuel cap 10 to make the flexure length of the gasket GS exceed 1.3 mm, the place of the large sealing face pressure shifts from the first pipe sealing projection GSd1 to the second pipe sealing projection GSd2. As shown in FIGS. 7 and 8, the gasket GS of the embodiment ensures the greater sealing face pressure with the smaller reactive force, compared with the prior art C-shaped gasket.

In order to ensure the sealing face pressure of at least a preset level against the flexure length of the gasket GS and prevent an excessive stress from being applied to the gasket GS, the stopper 21d (see FIG. 2) defines the full closing depth to be not less than 2 mm or preferably to be in a range of 3 to 5 mm.

Figure 9:
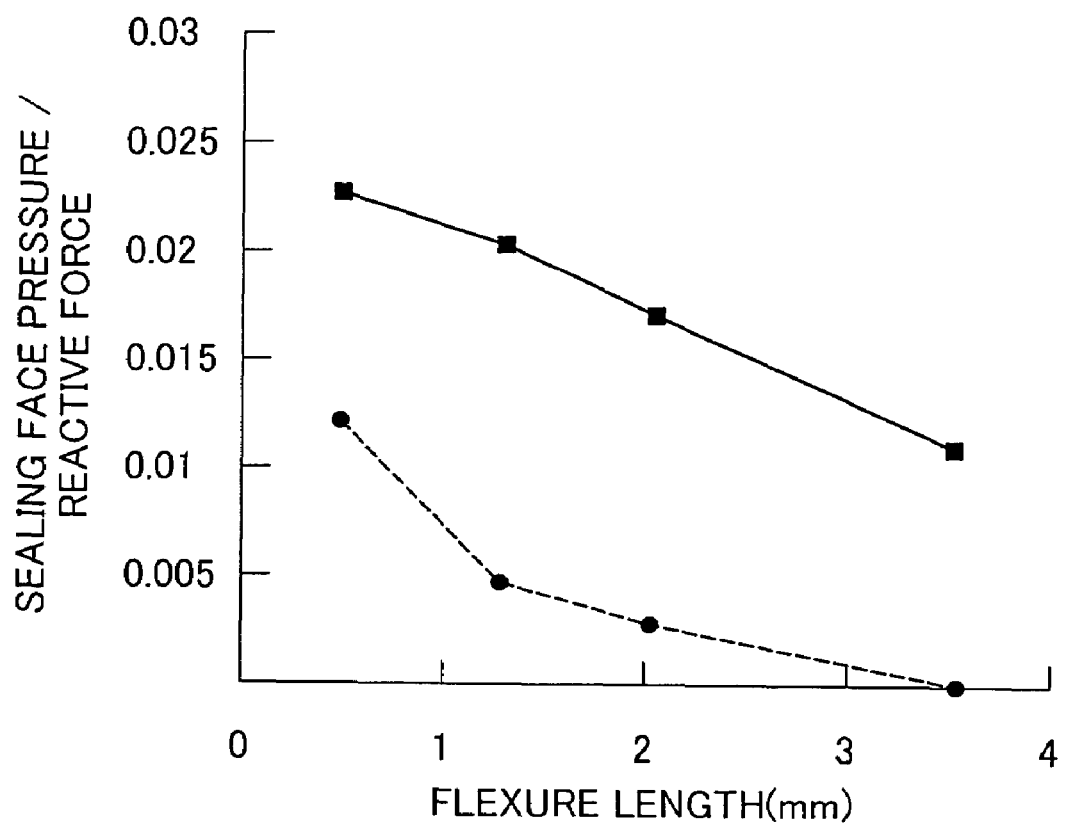
FIG. 9 is a graph showing variations in sealing face pressure by reactive force against the flexure length of the gasket.

FIG. 9 is a graph showing variations in sealing face pressure by reactive force against the flexure length of the gasket. The solid-line curve regards the gasket GS of the embodiment and the dotted-line curve regards the prior art C-shaped gasket. As clearly understood from the graph of FIG. 9, the gasket GS of the embodiment has the greater sealing face pressure per unit reactive force against the same flexure length, compared with the prior art C-shaped gasket.

(2)-2-3 Effects of Gasket GS

1. The gasket GS of the embodiment gives a greater sealing face pressure with a smaller closing force and ensures the good operating characteristics.

2. As shown in FIG. 5, the spaces defined by the thin wall sections GSf of the gasket GS reduce the total cross section of the gasket GS to 30 to 50% or preferably 35 to 45% of the area of the imaginary circle CL going through the apexes of the sealing projections GSc. The presence of the thin wall sections GSf desirably decreases the required quantity of the material, while ensuring the high sealing face pressure of the gasket GS. The gasket GS can thus be made of a rubber material having excellent fuel permeation resistance, for example, expensive fluororubber, without increasing the manufacturing cost. The fluororubber exerts the excellent fuel permeation resistance even when an alcohol of a small molecular weight is applied to the fuel.

3. The fuel cap 10 may adopt a quick-turn structure to open and close the inlet opening FNb by simple rotation of a preset angle, for example, 180 degrees. In this structure, the cover 40 is generally required to have a lost motion mechanism that idles in the range of a preset angle, in order to prevent a decrease in sealing face pressure of the gasket due to an external force applied to the cover 40. The gasket GS of the embodiment, however, ensures the high sealing properties even when the cover 40 receives an external force and rotates in its opening direction by approximately 90 degrees in to decrease the flexure length to about 1.6 mm. The gasket GS of the embodiment thus ensures the sufficient sealing face pressure of or over a preset level without the lost motion mechanism of the complicated structure.

4. While the gasket GS is swollen with the fuel, the first body sealing projection GSe1 and the second body sealing projection GSe2 prevent the outer face of the gasket main body GSa from coming into contact with the seal support element 24. This structure effectively prevents an increase in rotational torque with an increase in contact area.

5. The fuel cap 10 of the embodiment has the large screw thread pitch to move the cap main body 20 by at least 3 mm in the axial direction with a rotation of 180 degrees. This structure enables the fuel cap 10 to be opened and closed by rotation of a small angle and thus ensures the good operating characteristics.

6. The gasket GS of the embodiment is designed to hold the sealing face pressure of at least 0.3 MPa when the cap main body 20 is rotated by 90 degrees in its opening direction from the full close position. The gasket GS desirably ensures the sufficient sealing properties even when the cap main body 20 is rotated by approximately 90 degrees in its opening direction from the full close position due to an external force.

(2)-3 Structure of Cover 40

Referring back to FIG. 1, the cover 40 functions as a manipulating mechanism and is attached to the flange 22 via the torque mechanism 80 in a rotatable and freely detachable manner. The cover 40 includes an upper wall 41, a handle 42 mounted on the upper wall 41, and a side wall 43 formed around the upper wall 41 and is integrally made of a conductive resin by injection molding. Engagement projections 43a are protruded inward from the side wall 43 to be arranged at equal intervals along the circumference. The engagement projections 43a function to fix the cover 40 to the cap main body 20 via the torque mechanism 80. The attachment structure of the cover 40 is discussed below.

(2)-4 Construction of Torque Mechanism 80

(2)-4-1 General Structure of Torque Mechanism 80

Figure 10:
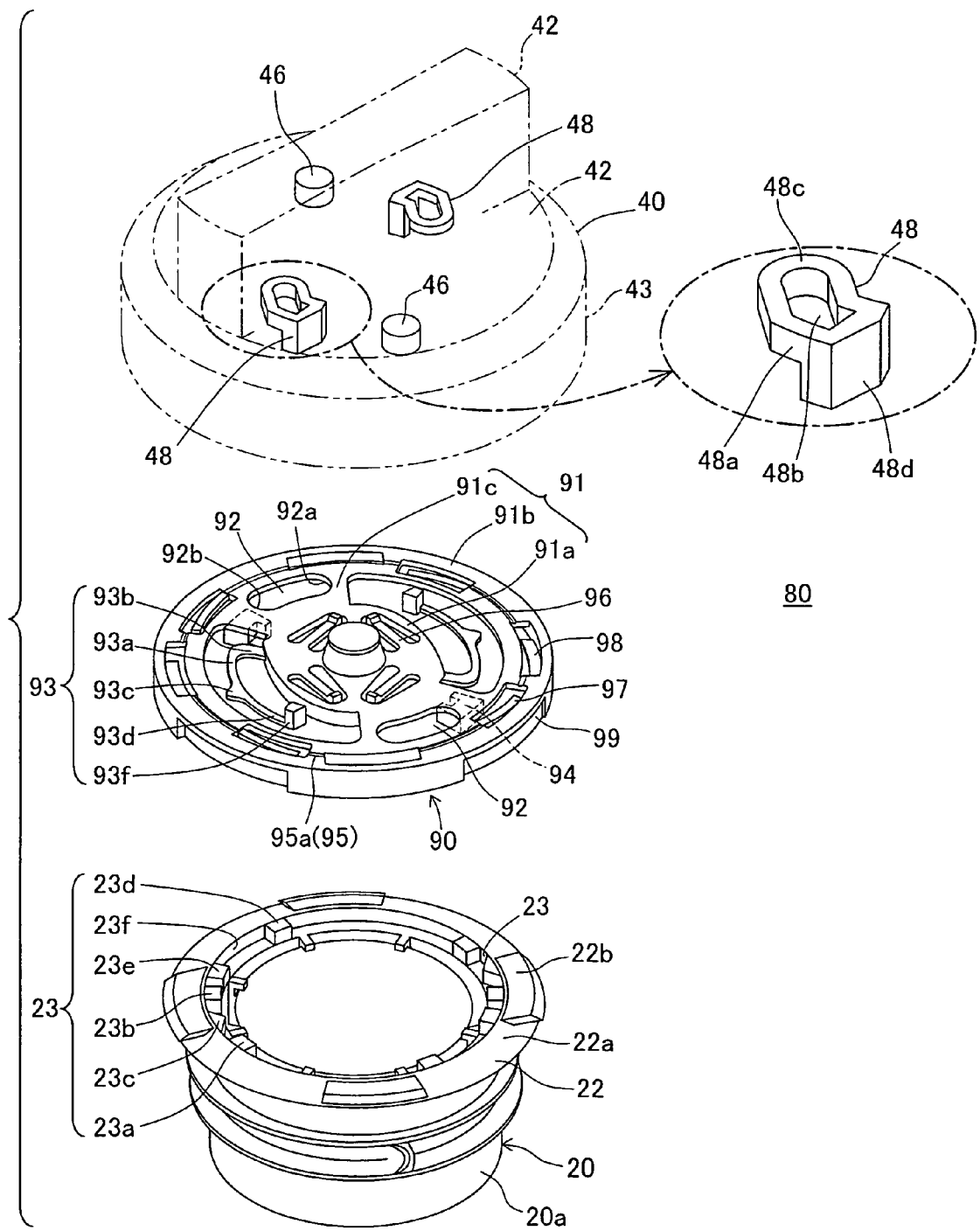
FIG. 10 is a decomposed perspective view showing a torque mechanism located on a cover and an upper portion of a cap main body.
Figure 11:
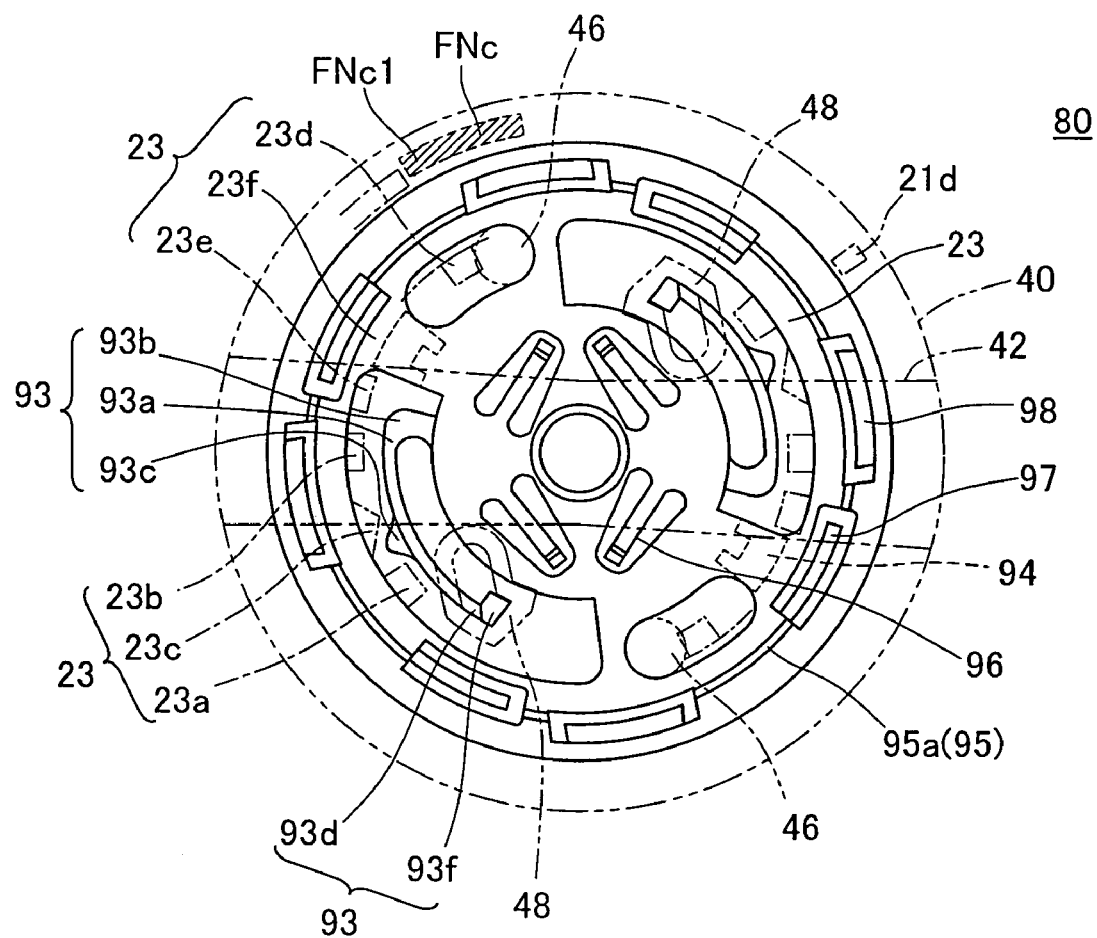
FIG. 11 is a top view of the torque mechanism.

FIG. 10 is a decomposed perspective view showing the torque mechanism 80 located on the cover 40 and the upper portion of the cap main body 20. FIG. 11 is a top view of the torque mechanism 80. The torque mechanism 80 clicks when the cover 40 receives a rotational torque of or over a preset level in the closing operation of the fuel cap 10 in the inlet opening FNb. The user can thus confirm that the fuel cap 10 is attached to the filler neck FN with a rotational torque of or over the preset level.

As shown in FIGS. 10 and 11, the torque mechanism 80 includes two body engagement elements 23 arranged along the circumference of the outer tubular body 20a, cover engagement elements 46 and guide elements 48 that are protruded from the bottom face of the upper wall 41 of the cover 40, and a torque plate 90.

(2)-4-2 Structure of Body Engagement Element 23

The body engagement elements 23 are arranged on the circumference of the outer tubular body 20a to catch the torque plate 90 for transmission of a rotational torque. Each of the body engagement elements 23 has a first locking end 23a, a second locking end 23b, and a ridge-like engagement projection 23c (first engagement element) protruded between the first locking end 23a and the second locking end 23b. The body engagement element 23 also has a first guide end 23d, a second guide end 23e, and a guide step 23f formed between the first guide end 23d and the second guide end 23e.

(2)-4-3 Structure of Cover 40

The two cover engagement elements 46 are protruded from the bottom face of the upper wall 41 of the cover 40 to be arranged along the circumference of the cover 40. Each of the cover engagement elements 46 of the cover 40 is a cylindrical projection to catch the torque plate 90 for transmission of a rotational torque. Each of the guide elements 48 has a peripheral guide wall 48a, a first guide groove 48b, and a second guide groove 48c. The first guide groove 48b is formed on the circumference around the rotational axis, while the second guide groove 48c is formed to be coupled with the first guide groove 48b and to be inclined relative to the axial center. A guide locking upright wall 48d is formed on the end of the first guide groove 48b and on the end of the peripheral guide wall 48a to face the first guide groove 48b.

(2)-4-4 Structure of Torque Plate 90

The torque plate 90 has a disc-shaped torque body 91 made of a resin. The torque body 91 includes a disc-shaped arm support 91a, an outer ring 91b surrounding the arm support 91a, and a linkage element 91c linking the arm support 91a with the outer ring 91b. Guide grooves, torque arms, and spring elements are formed on the torque body 91. Torque arms 93 (second engagement elements) are formed on the arm support 91a. Each of the torque arms 93 includes an arm body 93a protruded from the arm support 91a, a torque engagement projection 93c protruded from the outer circumference of the arm body 93a, and a guide projection 93f protruded upward from a free end 93d of the arm body 93a. The torque arm 93 is a cantilever with a support base 93b as the fulcrum and has the free end 93d apart from the torque body 91 by a certain distance.

With a rotation of the cover 40 in the closing direction (clockwise), the torque engagement projection 93c is pressed against the engagement projection 23c of the body engagement element 23. The dual support of the support base 93b and the free end 93d bends the torque arm 93 in the direction perpendicular to its longitudinal axis and causes the torque engagement projection 93c of the torque arm 93 to ride over the engagement projection 23c of the body engagement element 23 (see FIG. 19).

(2)-4-5 Attachment Structure of Torque Plate 90 and Cover 40

Figure 12:
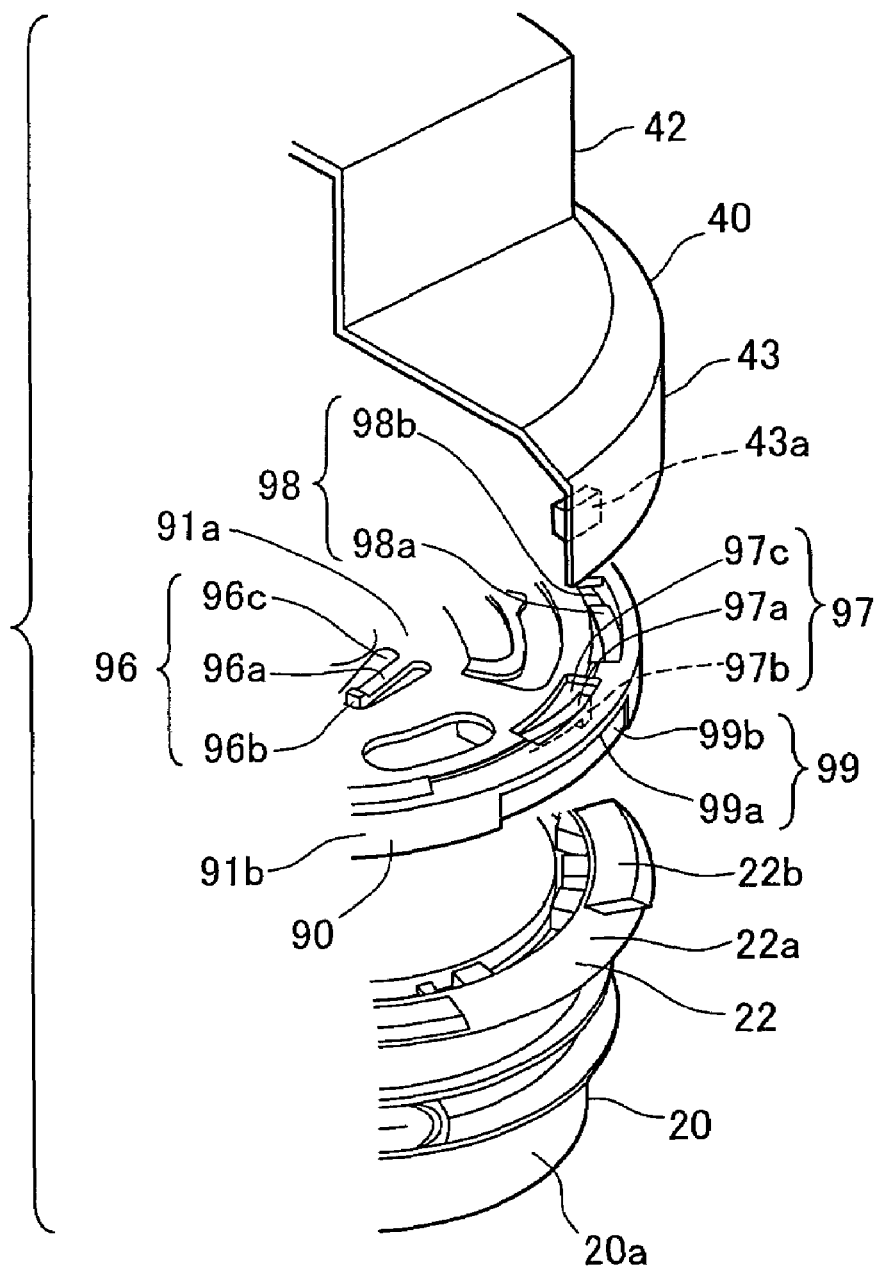
FIG. 12 is a perspective view showing a main part of the torque mechanism.
Figure 13:
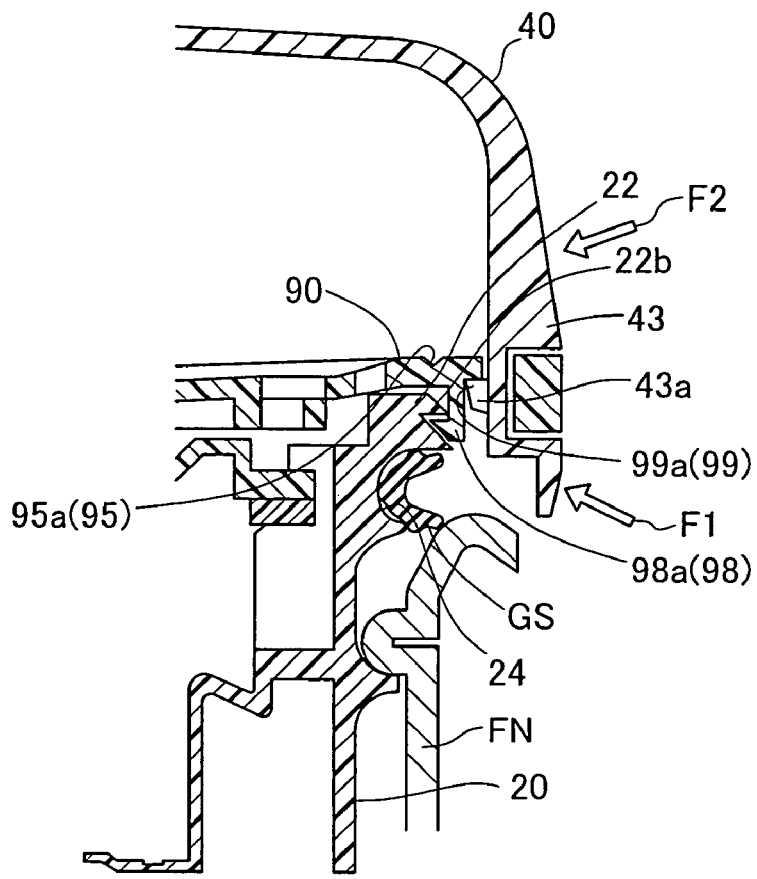
FIG. 13 is a sectional view showing the side of the fuel cap.

The following describes the attachment structure (plate attachment mechanism) of the cap main body 20 and the torque plate 90 and the attachment structure (grip attachment mechanism) of the torque plate 90 and the cover 40. FIG. 12 is a perspective view showing a main part of the torque mechanism 80. FIG. 13 is a sectional view showing the side of the fuel cap 10. Catching claws 98a of plate engagement elements 98 are formed is along the inner circumference of the outer ring 91b of the torque plate 90. The catching claws 98a are protruded from the inner wall of the outer ring 91b toward the center axis and are formed to be observable from the top through notches 98b and elastically deformable in the axial direction. Arc-shaped catching projections 22b are formed on the outer circumference of the flange 22 of the cap main body 20. The torque plate 90 is attached to the cap main body 20 in a rotatable manner through engagement of the catching claws 98a with the catching projections 22b.

Fixation elements 99 are arranged on the outer circumference of the outer ring 91b of the torque plate 90. Each of the fixation elements 99 has a catching recess 99b to form a catching claw 99a. The engagement projections 43a formed inward on the side wall 43 of the cover 40 are fit in the catching recesses 99b of the mating fixation elements 99, so that the torque plate 90 supports the cover 40 in a rotatable manner (approximately 20 degrees). The fixation positions of the engagement projections 43a with the catching recesses 99b of the fixation elements 99 is located above the fixation positions of the catching claws 98a of the plate engagement elements 98 with the catching projections 22b of the flange 22.

The torque plate 90 is attached to the cap main body 20 through engagement of catching claws 98a of the plate engagement elements 98 of the torque plate 90 with the catching projections 22b of the flange 22 of the cap main body 20. The cover 40 is then attached to the torque plate 90 through engagement of the engagement projections 43a of the cover 40 with the catching claws 99a of the torque plate 90. This assembles the cap main body 20, the torque plate 90, and the cover 40 to the fuel cap 10.

As shown in FIG. 10, fragile grooves 95a as part of fragile elements 95 are formed along the inner circumference of the outer ring 91b of the torque plate 90. The fragile grooves 95a are located to link the notches 98b in the circumferential direction.

When large external forces F1 and F2 are applied to the cover 40 as shown in FIG. 13, for example, at the time of a collision of a vehicle, the fragile elements 95 supporting the cover 40 may be broken along the circumference of the torque plate 90. Otherwise the catching claws 98a of the plate engagement elements 98 may be detached from the catching projections 22b of the flange 22, or the engagement projections 43a of the cover 40 may be detached from the fixation elements 99. In any case, the seal support element 24 of the cap main body 20 for holding the gasket GS is not damaged and thus ensures the sufficiently high sealing properties of the gasket GS. The fixation positions of the engagement projections 43a of the cover 40 with the catching recesses 99b of the fixation elements 99 of the torque plate 90 is located above the fixation positions of the catching claws 98a of the plate engagement elements 98 with the catching projections 22b of the flange 22. Application of the upper external force F2 in addition to the external force F1 leads to detachment of either the cover 40 or the torque plate 90. The structure of the embodiment thus ensures the high sealing properties against diverse external forces. In the case of application of the external force F2 onto the cover 40, the momentum is generated from the opposite fixation element 99 as the fulcrum to readily detach the cover 40.

The plate engagement elements 98 (plate attachment mechanism) and the fixation elements 99 (grip attachment mechanism) are optimized to set the breaking loads against the diverse external forces without restriction of the shape of the seal support element 24.

(2)-4-6 Support Mechanism of Torque Plate 90

Figure 14:
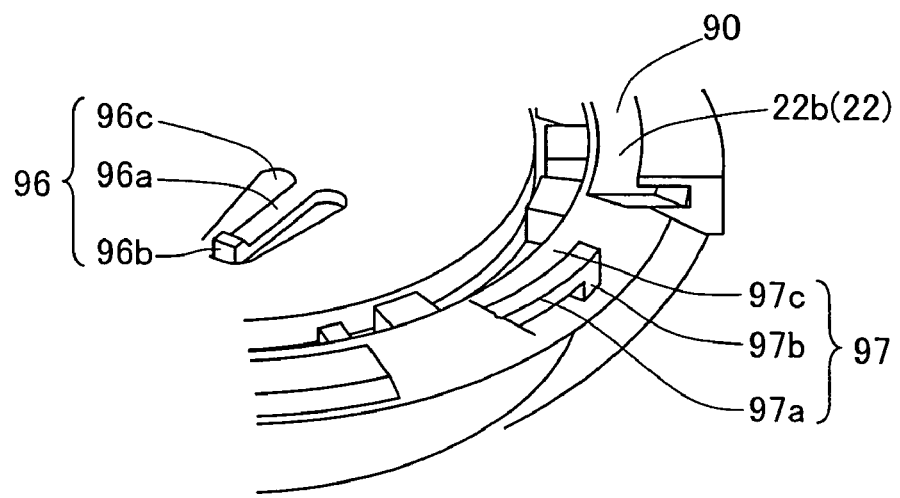
FIG. 14 shows the periphery of a torque plate in the torque mechanism.
Figure 15:
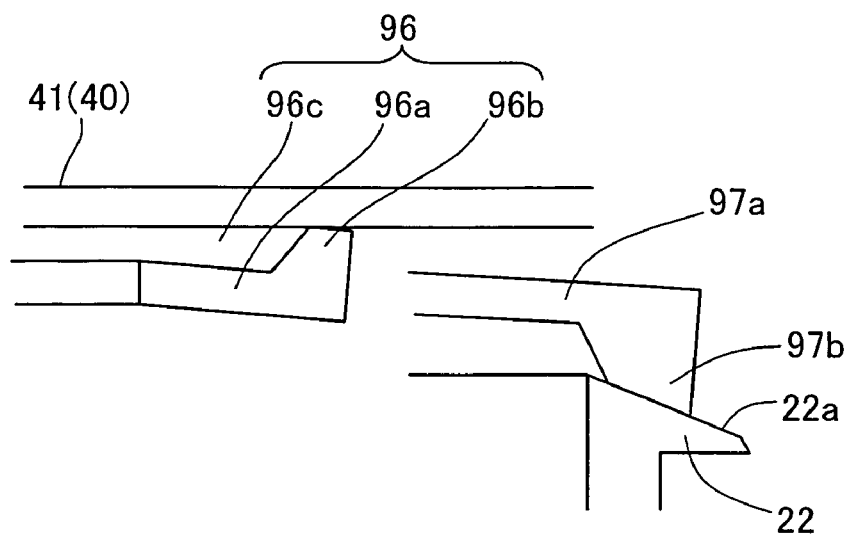
FIG. 15 shows the functions of first springs and second springs.

FIG. 14 shows the periphery of the torque plate 90. As shown in FIGS. 10 and 14, the torque plate 90 has first springs 96 and second springs 97 to hold the torque plate 90 between the bottom face of the upper wall 41 of the cover 40 and the upper portion of the cap main body 20. The four first springs 96 are arranged at angles of 90 degrees in the circumferential direction on the center portion of the torque plate 90. The first springs 96 apply a vertical spring force to the bottom face of the upper wall 41 of the cover 40. As shown in FIG. 15, each of the first springs 96 has an arm 96a that is formed on the same plane as the top face of the torque plate 90 and is extended as a cantilever in the circumferential direction, and a pressure projection 96b that is formed on a free end of the arm 96a to be protruded upward from the top face of the torque plate 90. Each of the second springs 97 has an arm body 97a that is formed as a cantilever slightly inclined downward, and a pressure projection 97b that is formed on a free end of the arm body 97a to be pressed against an inclined plane 22a of the flange 22. One end of the second spring 97 is tilted in a notch 97c formed on the top face of the torque plate 90. The pressure projections 97b of the second springs 97 press the inclined plane 22a of the flange 22, so that the second springs 97 are positioned in both the vertical direction and in the radial direction.

(3) Opening and Closing Operations of Fuel Cap 10

Figure 18:
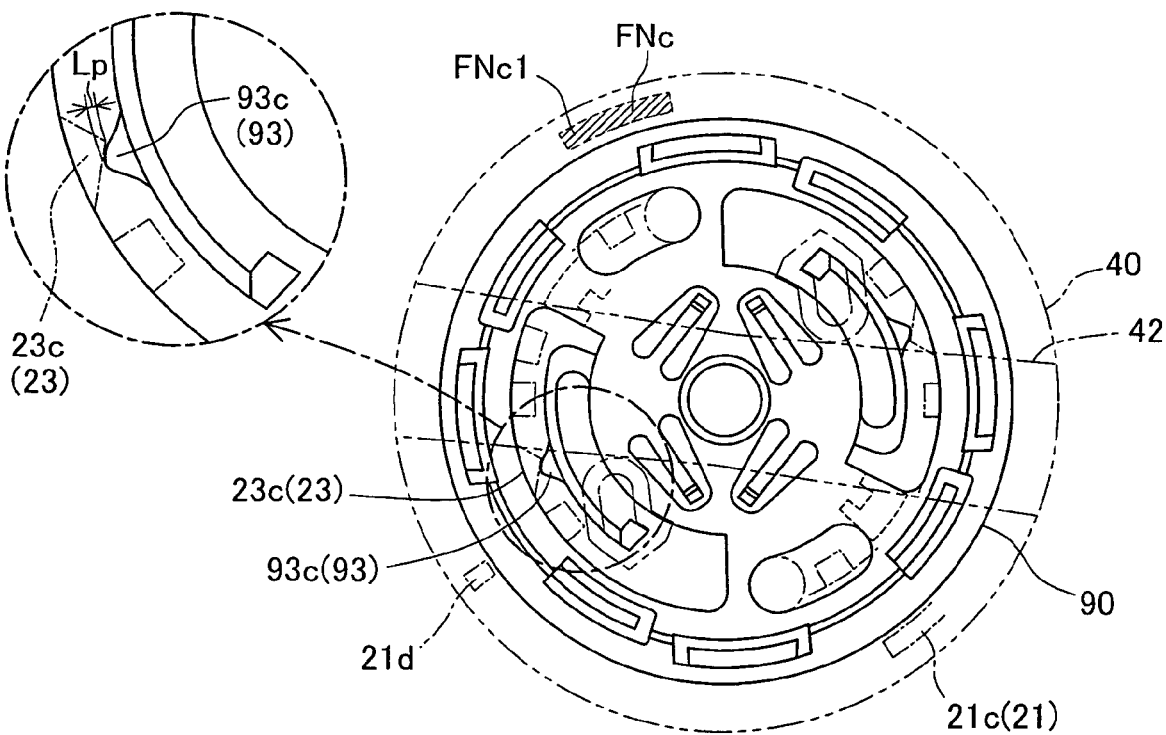
FIG. 18 shows the series of operations of the torque mechanism after the state of FIG. 17.
Figure 19:
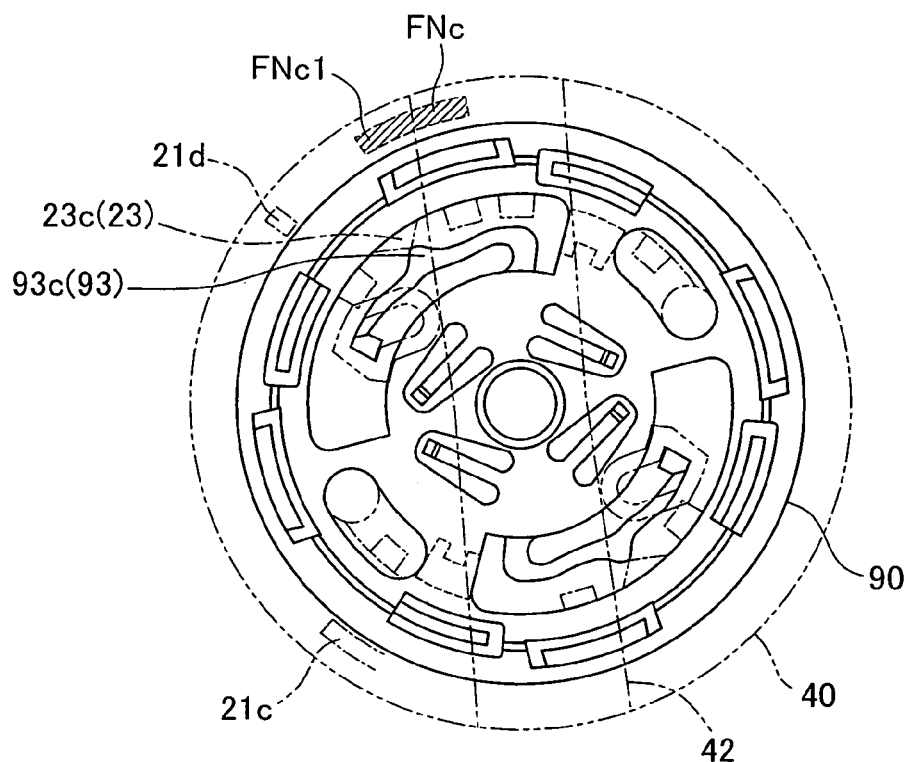
FIG. 19 shows the series of operations of the torque mechanism after the state of FIG. 18.
Figure 20:
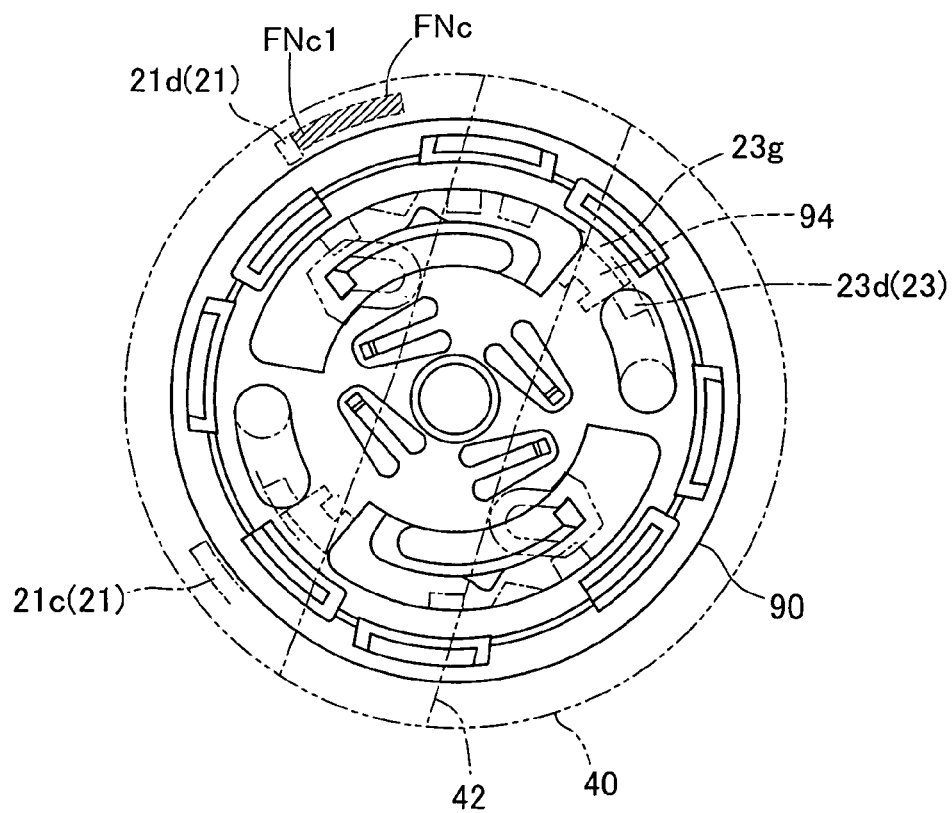
FIG. 20 shows the series of operations of the torque mechanism after the state of FIG. 19.
Figure 21:
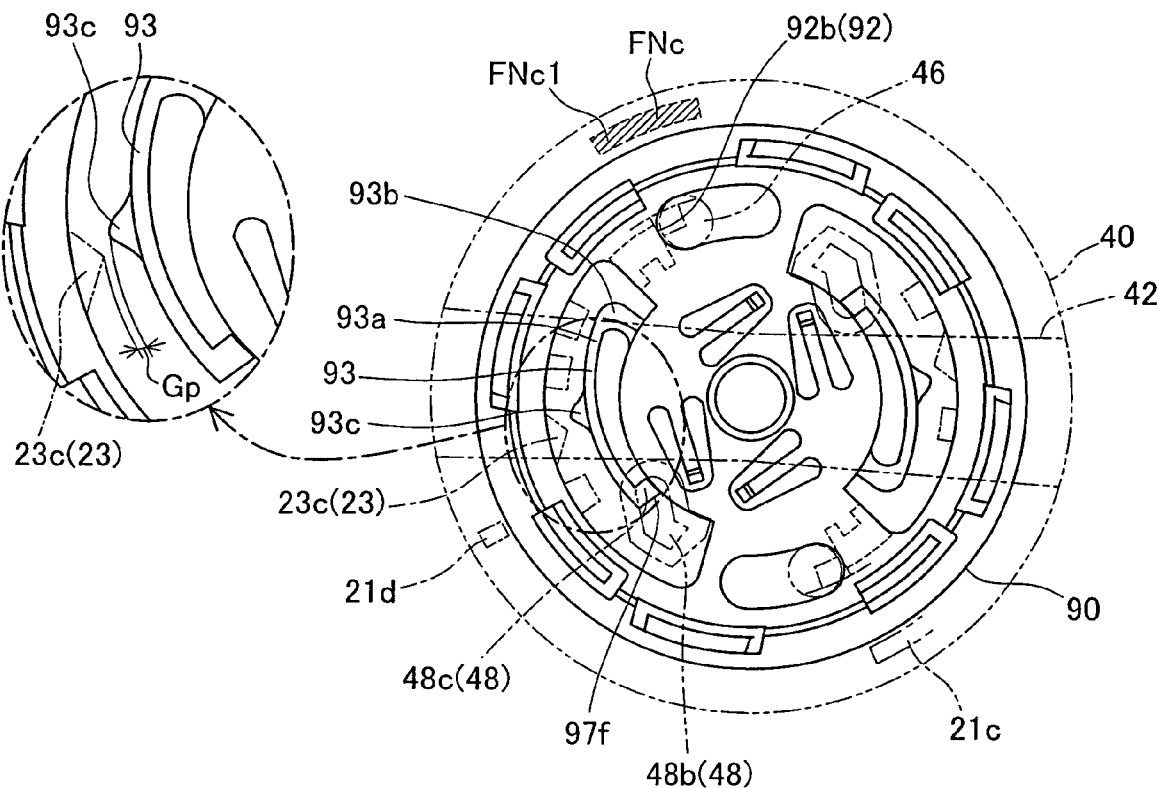
FIG. 21 shows the series of operations of the torque mechanism after the state of FIG. 20.
Figure 22:
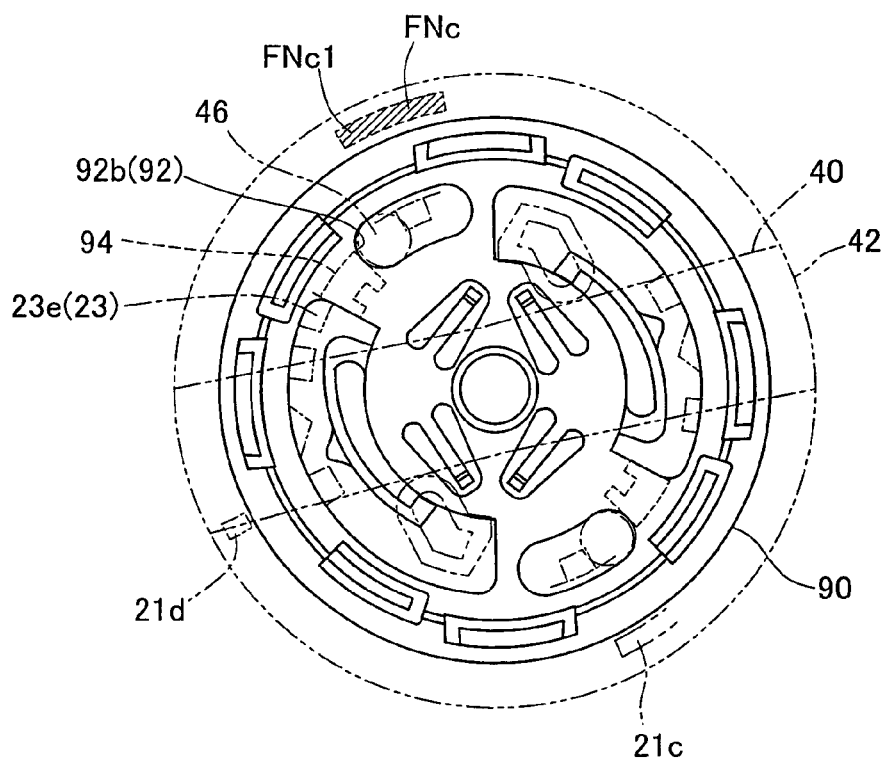
FIG. 22 shows the series of operations of the torque mechanism after the state of FIG. 21.

The following describes the functions of the torque mechanism 80 when the inlet opening FNb of the filler neck FN is opened and closed by the fuel cap 10. FIGS. 16 through 20 show a closing operation of the fuel cap 10. FIGS. 20 through 22 show an opening operation of the fuel cap 10. The torque mechanism 80 has two cover engagement elements 46, 46, two guide elements 48, 48, two torque arms 93, 93, and two body engagement elements 23, 23 arranged about the rotational axis of the torque plate 90, as mentioned above. The torque mechanism 80 accordingly has the symmetrical operations.

(3)-1 Closing Operation of Fuel Cap 10

The user holds the handle 42 of the cover 40 with thumb and index finger and inserts the cap main body 20 in the axial direction into the inlet opening FNb. The leader 21c of the male threading element 21 is set on the leader FNc1 of the female threading element FNc (see FIG. 2). When the user applies a rotational force to the handle 42 in the closing direction (clockwise), the torque mechanism 80 performs a series of operations as shown in FIGS. 16 to 20.

Figure 16:
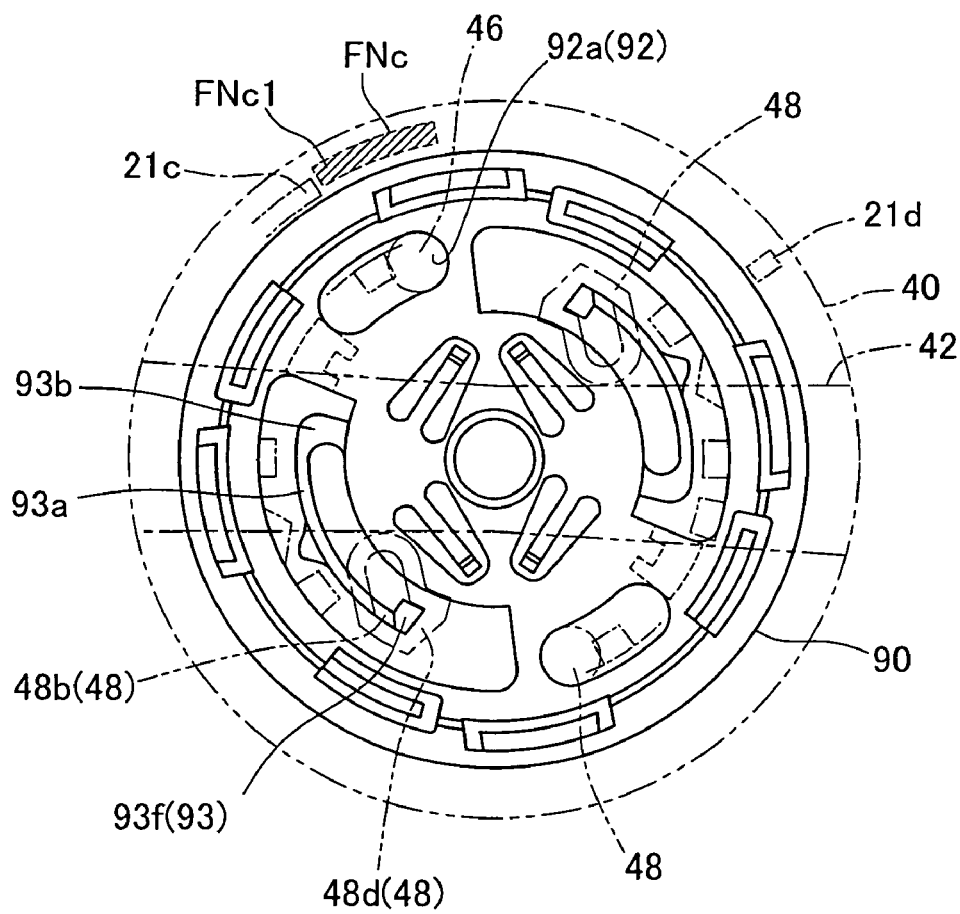
FIG. 16 shows a series of operations of the torque mechanism.

When a rotational force is applied to the handle 42 in the closing direction, the cover engagement elements 46, 46 of the cover 40 are guided by mating rib guide elements 92, while the guide projections 93f of the torque arms 93 are guided by the mating guide elements 48, as shown in FIG. 16. The cover engagement elements 46 then come into contact with pressure ends 92a of the respective rib guide elements 92, while the guide projections 93f of the torque arms 93 respectively move in the first guide grooves 48b to come into contact with the guide locking upright walls 48d. In this state, the cover 40 moves together with the torque plate 90 in the closing direction, and the torque arms 93 are supported by both the support bases 93b and the guide projections 93f.

Figure 17:
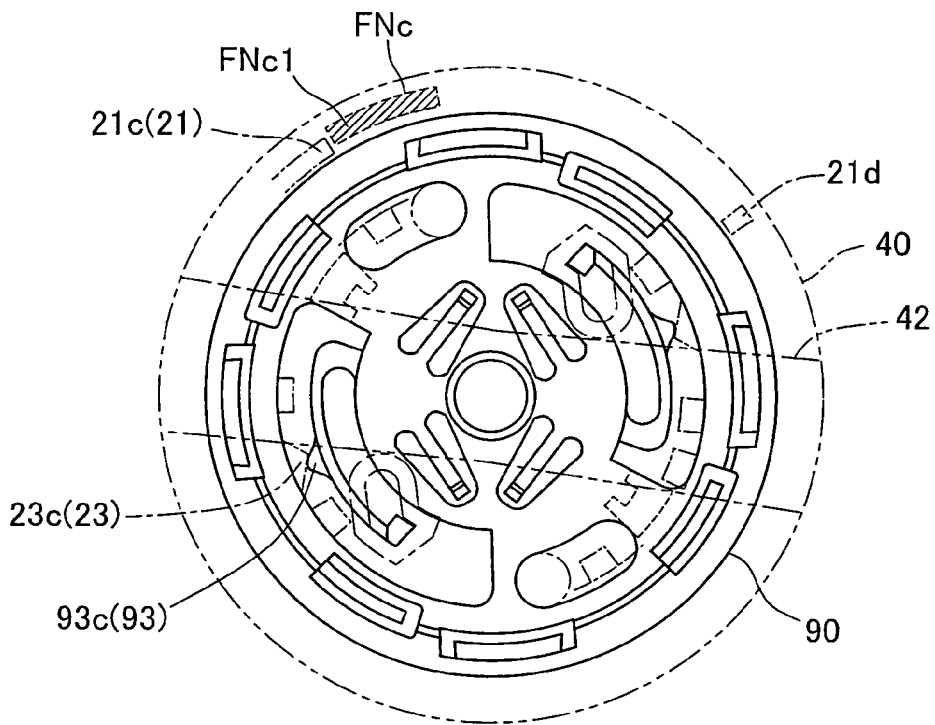
FIG. 17 shows the series of operations of the torque mechanism after the state of FIG. 16.

The cover 40 and the torque plate 90 are slightly rotated as shown in FIG. 17. The torque engagement projections 93c of the torque arms 93 then engage with the engagement projections 23c of the body engagement elements 23 by a lap Lp as shown in FIG. 18. Rotation of the handle 42 by approximately 180 degrees causes the cap main body 20 to be rotated integrally with the cover 40 and the torque plate 90 through this engagement. This inserts the cap main body 20 into the inlet opening FNb in the closing direction and enhances the engagement force of the male threading element 21 with the female threading element FNc. When the reactive force produced by the increasing engagement force exceeds a preset rotational torque, the torque engagement projections 93c of the torque arms 93 ride over the engagement projections 23c of the body engagement elements 23 to be set in a released position, as shown in FIG. 19.

With a slight rotation of the torque plate 90, the engagement projections 23c of the body engagement elements 23 engage with the torque engagement projections 93c of the torque arms 93 by the lap Lp (see FIG. 18) and press the torque engagement projections 93c in the radial direction. The torque arms 93 supported by the two fulcrums are thus elastically deformed to be set in a released position. The torque arms 93 click when being set in the released position. The fuel cap 10 is thus fit in the inlet opening FNb with some clamping torque to closes the inlet opening FNb. In the released position of the torque arms 93, guide projections 94 move in the guide steps 23f to come into contact with the first guide ends 23d as shown in FIG. 20. The cover 40, the torque plate 90, and the cap main body 20 rotate integrally to bring the stopper 21d of the male threading element 21 into contact with the leader FNc1 of the female threading element FNc. This prevents excessive compression of the gasket GS.

(3)-2 Opening Operation of Fuel Cap 10

In order to open the fuel cap 10, the user holds the handle 42 of the cover 40 with thumb and index finger and applies a counterclockwise rotational force to the handle 42 in the state of FIG. 20. In this state, the cap main body 20 is fit in the filler neck FN. The cover engagement elements 46 of the cover 40 move in the mating rib guide elements 92 to come into contact with pressure ends 92b, while the guide elements 48 guide the guide projections 93f of the torque arms 93 through the first guide grooves 48b to the second guide grooves 48c and bend the arm bodies 93a of the torque arms 93 about the support bases 93b toward the center, as shown in FIG. 21. The torque engagement projections 93c of the torque arms 93 are thus deflected toward the center to be apart from the engagement positions with the engagement projections 23c of the body engagement elements 23. This produces a gap Gp and gives no lap Lp (see FIG. 18).

As shown in FIG. 22, as the cover 40 and the torque plate 90 rotate counterclockwise relative to the cap main body 20, the guide projections 94 are guided on the guide steps 23f to come into contact with the second guide ends 23e. The torque engagement projections 93c of the torque arms 93 move in the deflected position not to engage with the engagement projections 23c of the body engagement elements 23. The torque arms 93 accordingly do not click.

While the guide projections 94 are in contact with the second guide ends 23e, the rotational torque of the cover 40 is transmitted to the cap main body 20 via the cover engagement elements 46 of the cover 40, the pressure ends 92b of the torque arms 93, the guide projections 94, and the second guide ends 23e of the body engagement elements 23. The cover 40, the torque plate 90, and the cap main body 20 thus rotate integrally counterclockwise.

Rotation of the cap main body 20 with the cover 40 by approximately 180 degrees resumes the state of FIG. 16. The male threading element 21 is separate from the leader FNc1 of the female threading element FNc of the filler neck FN, so that the cap main body 20 is released from the filler neck FN. The fuel cap 10 is then detached from the filler neck FN to open the inlet opening FNb.

Figure 23:
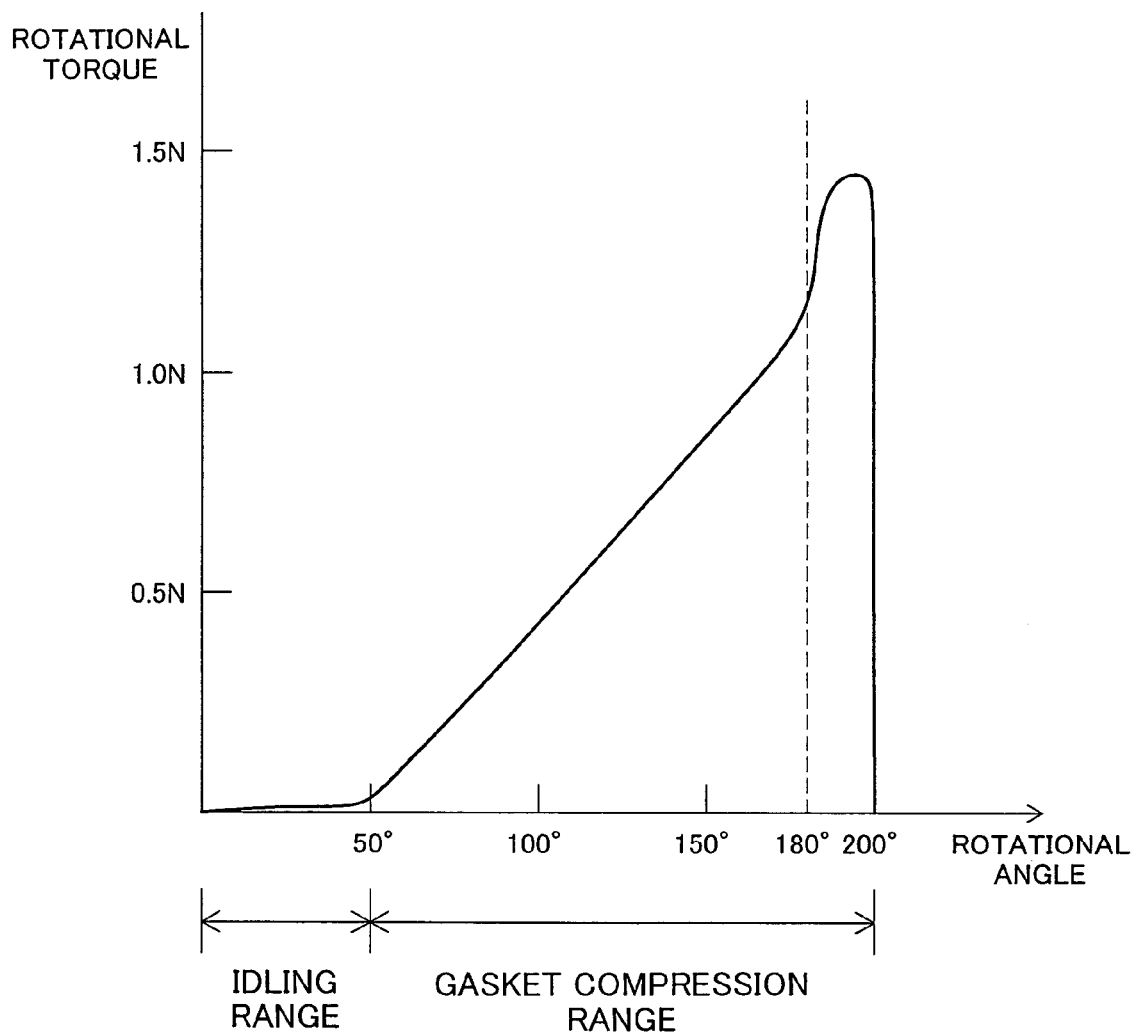
FIG. 23 is a graph showing a variation in rotational torque against the rotational angle of a grip member.
Figure 24:
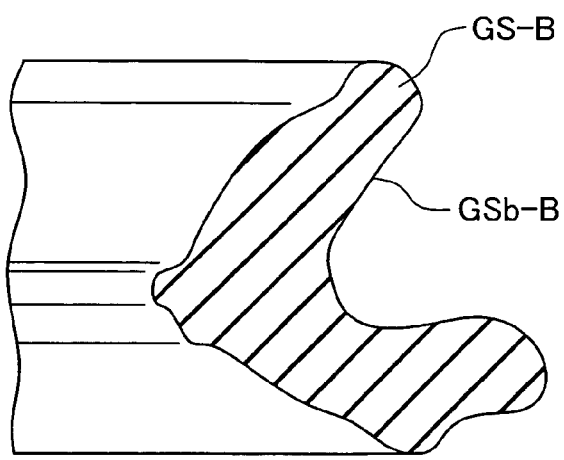
FIG. 24 is a sectional view showing a gasket in one modified example.
Figure 25:
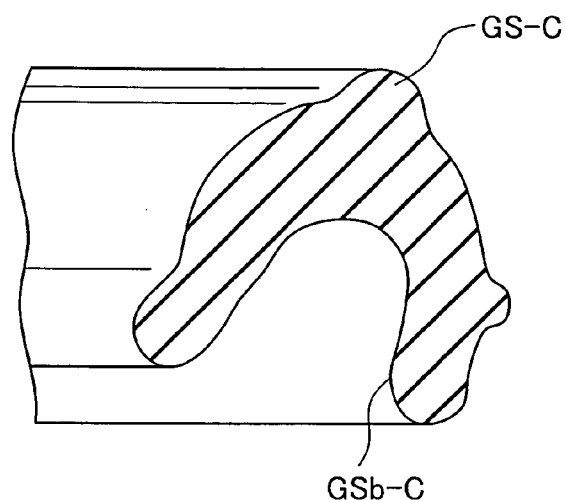
FIG. 25 is a sectional view showing a gasket in another modified example.

FIG. 23 is a graph showing a variation in rotational torque against the rotational angle of the handle 42. In the initial state of the closing operation when the fuel cap 10 is inserted into the inlet opening FNb and the handle 42 is rotated in the range of 0 to 50 degrees, the male threading element 21 does not engage with the female threading element FNc (idling state). The gasket GS is accordingly not contact with the pipe sealing face FNf Further rotation of the handle 42 exceeding 50 degrees compresses the gasket GS and increases the rotational torque. The gasket GS is gradually compressed from the state of FIG. 6(A) to the state of FIG. 6(B) and then the state of FIG. 6(C). When the rotational angle of the handle 42 exceeds 180 degrees, the torque mechanism 80 clicks (in the state of FIG. 19). When the rotational angle of the handle 42 reaches 200 degrees, the stopper 21d works to stop further rotation of the fuel cap 10 (in the state of FIG. 20).

(4) Effects of Embodiment

The structure of the embodiment has the following effects, in addition to those discussed above.

(4)-1 In the closing operation of the fuel cap 10, the torque plate 90 clicks when the torque engagement projections 93c of the torque arms 93 of the torque plate 90 ride over the engagement projections 23c of the body engagement elements 23. The user can thus confirm clamping of the fuel cap 10 with a certain level of torque. This structure enables the fuel cap 10 to be clamped with the certain level of torque, regardless of the elasticity of the gasket GS.

(4)-2 In the structure of the torque mechanism 80, when the cover 40 is rotated in the opening direction to open the fuel cap 10, the torque engagement projections 93c of the torque arms 93 are deflected by the guide elements 48 toward the center axis not to be in contact with the engagement projections 23c of the body engagement elements 23. The positional relation between the torque engagement projections 93c and the engagement projections 23c thus resume the initial state without any contact. In this state, the rotational torque is sufficiently small and there is no click. The user accordingly feels anything odd.

(4)-3 At a start of the closing operation of the fuel cap 10, the handle 42 is located at a preset position defined by the leader FNc1 of the female threading element FNc as shown in FIG. 16. At a start of the opening operation of the fuel cap 10, the handle 42 is located at another preset position defined by the stopper 21d of the male threading element 21 in contact with the leader FNc1 of the female threading element FNc as shown in FIG. 20. This ensures the good operating characteristics. Simple integral formation of the stopper 21d with the male threading element 21 makes the fuel cap 10 applicable to the filler neck FN with the conventional female threading element FNc. This does not cause a significant cost increase.

(4)-4 The maximum rotational angle of the fuel cap 10 in the closing direction is 160 to 200 degrees. Namely the fuel cap 10 is fully closed by approximately half a turn of the handle 42. This structure does not require plural turns of the handle 42 and thus ensures the good operating characteristics.

(5) Modifications

The embodiment discussed above is to be considered in all aspects as illustrative and not restrictive. There may be many modifications, changes, and alterations without departing from the scope or spirit of the main characteristics of the present invention. Some examples of possible modification are given below.

(5)-1 The above embodiment regards the structure of the fuel cap used for the fuel tank of the automobile. The structure of the invention may be applied to another cap, for example, a cap for a radiator tank.

Figure 26:
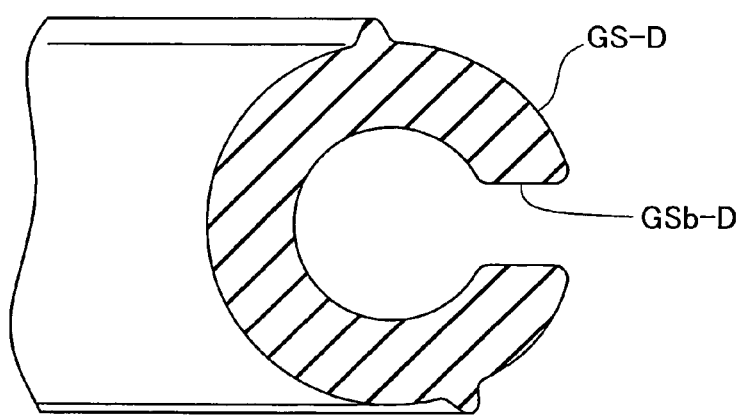
FIG. 26 is a sectional view showing a gasket in still another modified example.
Figure 27:
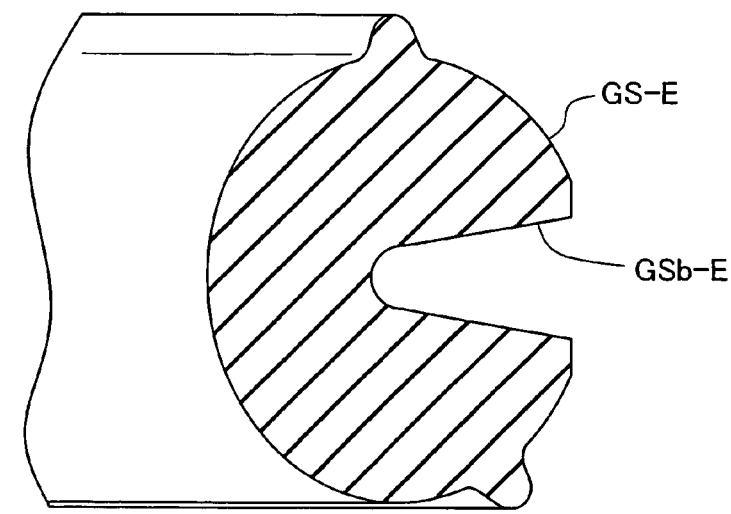
FIG. 27 is a sectional view showing a gasket in another modified example.
Figure 28:
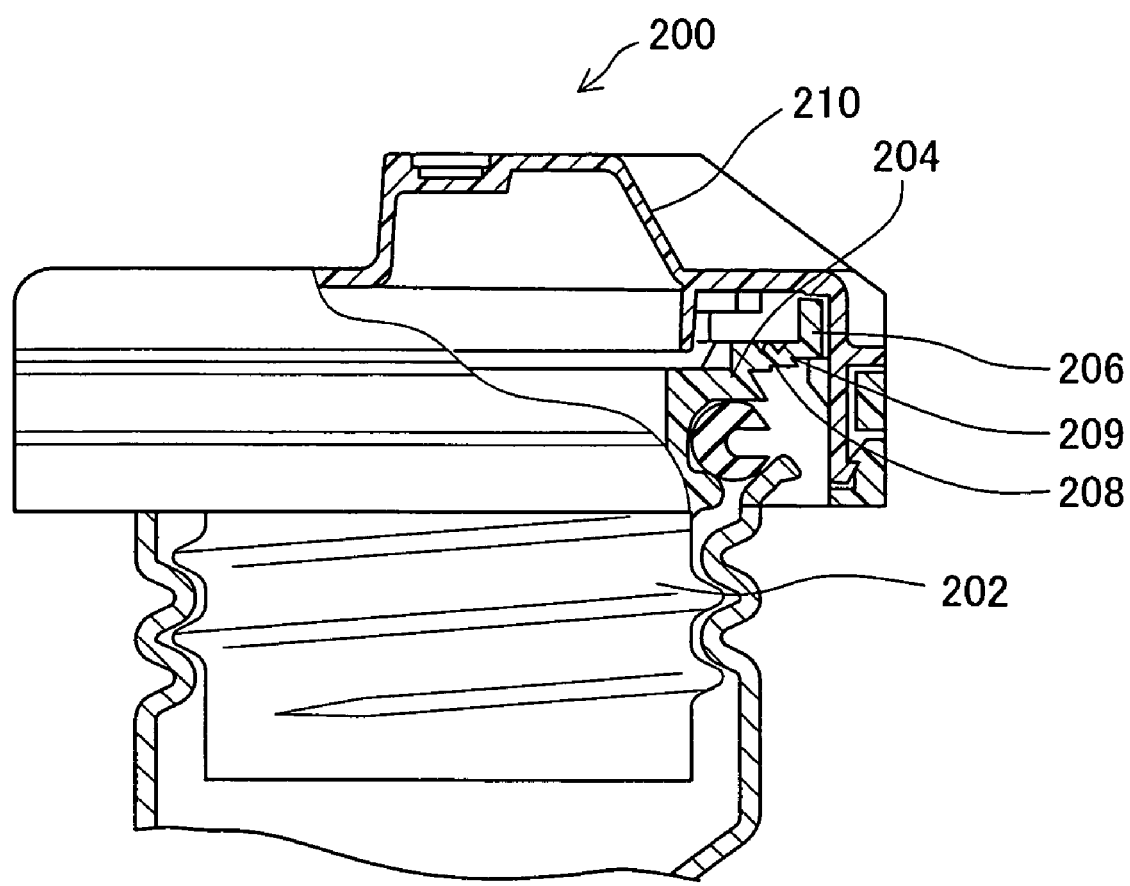
FIG. 28 is a partly sectional, side view showing a related art fuel cap for a fuel tank of an automobile.

(5)-2 The structure of the gasket is not restricted to the above embodiment, but the gasket may have any of other cross sections shown in FIGS. 24 through 27. A gasket GS-B shown in FIG. 24 has a slit GSb-B open slightly upward. A gasket GS-C shown in FIG. 25 has a slit GSb-C open downward. This structure effectively prevents an undercut of the slit GSb-C and facilitates release of the gasket GS-C from a mold. A gasket GS-D shown in FIG. 26 is formed in a C shape and has a slit GSb-D that extends from a center circle to the outside. A gasket GS-E shown in FIG. 27 is formed in an elliptic shape and has a V-shaped slit GSb-E.

(5)-3 In the above embodiment, the fuel cap 10 applies the torsional force to the gasket GS in its rotation. The fuel cap may be closed by a vertical operational force, as long as the force is applied in the bending direction (in the direction of the rotational axis).

(5)-4 The tank with the gasket is not restricted to the fuel tank but may be any tank for storing another fluid.

(5)-5 The material of the gasket is not restricted to the fluororubber, but the gasket may be made of another material, for example, elastomer like NBR-PVC.

(5)-6 In the structure of the embodiment, when the fuel cap 10 is rotated in the closing direction, the torque engagement projections 93c engage with the engagement projections 23c by the lap Lp as shown in FIG. 18. When the fuel cap 10 is rotated in the opening direction, on the other hand, the torque arms 93 are deflected to produce a gap Gp and no lap Lp as shown in FIG. 21. The lap Lp may not be equal to zero but may be reduced to a level that does not make the user feel odd.

(5)-7 In the embodiment discussed above, the stopper is applied to the quick-turn constant torque cap. The stopper may be applied to the conventional screw cap or constant displacement cap. The constant displacement cap ensures the sealing properties of or over a certain level by the stroke (displacement) in the axial direction, instead of the torque. The use of the stopper effectively notifies the user of full close of the cap.

All changes within the meaning and range of equivalency of the claims are intended to be embraced therein. The scope and spirit of the present invention are indicated by the appended claims, rather than by the foregoing description.

What is claimed is:

1. A cap device that opens and closes a tank opening, the cap device comprising:
    a closer that closes the tank opening;
    a handle mechanism that rotates the closer about a rotation axis of the closer and includes a handle and a cover that holds the handle;
    a torque plate interposed between the closer and the handle mechanism, the torque plate transmitting a rotational torque applied to the handle mechanism in a closing direction and an opening direction to the closer within a preset level;
    a plate attachment mechanism that attaches the torque plate to the closer, the plate attachment mechanism being configured such that parts of the torque plate are elastically deformed by an external force applied to the handle mechanism and thereby detaching the torque plate from the closer; and
    a handle mechanism attachment mechanism that holds the handle mechanism on an outer circumference of the torque plate in a rotatable manner,
    wherein the handle mechanism attachment mechanism is arranged about the rotation axis of the closer and outside the plate attachment mechanism,
    wherein the torque plate has first springs and second springs that hold the torque plate between an upper wall of the cover and an upper portion of the closer,
    wherein the first springs and the second springs include an arm formed as a cantilever that is elastically deformed in an axial direction of the closer,
    wherein the torque plate has a fragile element formed along an inner circumference of the torque plate, and
    wherein the fragile element includes fragile grooves on the torque plate.

2. The cap device in accordance with claim 1, wherein the plate attachment mechanism has an elastically deformable catching claw that is formed on an outer circumference of the torque plate, and a catching projection that is formed on an outer circumference of the closer to engage with the catching claw.

3. The cap device in accordance with claim 2, wherein the handle mechanism includes a handle and a cover that holds the handle and surrounds an upper portion and the outer circumference of the torque plate, and
    the handle mechanism attachment mechanism includes an engagement projection that is formed on an inner wall of the cover, and a catching recess that is formed on the outer circumference of the torque plate to engage with the engagement projection.

* * * * *